(12) United States Patent
Minami et al.

(10) Patent No.: US 8,988,569 B2
(45) Date of Patent: Mar. 24, 2015

(54) IMAGE PICKUP UNIT AND IMAGE PICKUP DISPLAY SYSTEM

(71) Applicant: Sony Corporation, Tokyo (JP)

(72) Inventors: Yuichiro Minami, Kanagawa (JP); Michiru Senda, Kanagawa (JP); Yasuhiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 13/661,103

(22) Filed: Oct. 26, 2012

(65) Prior Publication Data

US 2013/0107088 A1 May 2, 2013

(30) Foreign Application Priority Data

Nov. 2, 2011 (JP) ................................. 2011-241036

(51) Int. Cl.
*H04N 3/14* (2006.01)
*H04N 5/32* (2006.01)
*H04N 5/378* (2011.01)

(52) U.S. Cl.
CPC . *H04N 5/32* (2013.01); *H04N 5/378* (2013.01)
USPC .......................................................... 348/294

(58) Field of Classification Search
CPC ........ H04N 5/369; H04N 5/374; H04N 5/378
USPC .......................................................... 348/294
See application file for complete search history.

(56) References Cited

U.S. PATENT DOCUMENTS

| 5,227,900 | A | 7/1993 | Inaba et al. | |
|---|---|---|---|---|
| 6,801,253 | B1 * | 10/2004 | Yonemoto et al. | 348/241 |
| 2004/0080644 | A1 * | 4/2004 | Suzuki et al. | 348/301 |
| 2011/0128428 | A1 * | 6/2011 | Takatoku et al. | 348/307 |
| 2011/0147596 | A1 * | 6/2011 | Ishida et al. | 250/366 |
| 2011/0310678 | A1 | 12/2011 | Lin | |
| 2013/0107092 | A1 | 5/2013 | Minami et al. | |

FOREIGN PATENT DOCUMENTS

JP 2011-135561 A 7/2011

* cited by examiner

*Primary Examiner* — James Hannett
(74) *Attorney, Agent, or Firm* — Wolf, Greenfield & Sacks, P.C.

(57) ABSTRACT

An image pickup unit includes: an image pickup section including a plurality of pixels, each of the pixels including a photoelectric conversion device; and a drive section driving each of the pixels to perform a readout operation, a pre-reset operation, and a main reset operation in this order, the readout operation being intended to read out charge from each of the pixels as a signal, the charge being obtained from the photoelectric conversion device, and the pre-reset operation and the main reset operation being intended to reset the charge in the each of the pixels. The drive section applies a voltage to the photoelectric conversion device, the voltage being different between in the pre-reset operation and in the main reset operation.

12 Claims, 23 Drawing Sheets

PRE-RESET OPERATION BY REVERSE BIAS VOLTAGE (Vpd>0)
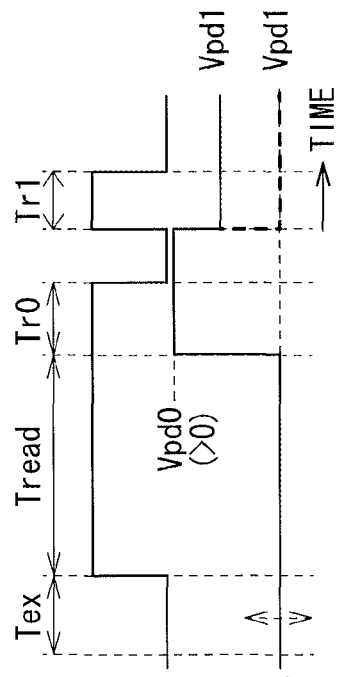
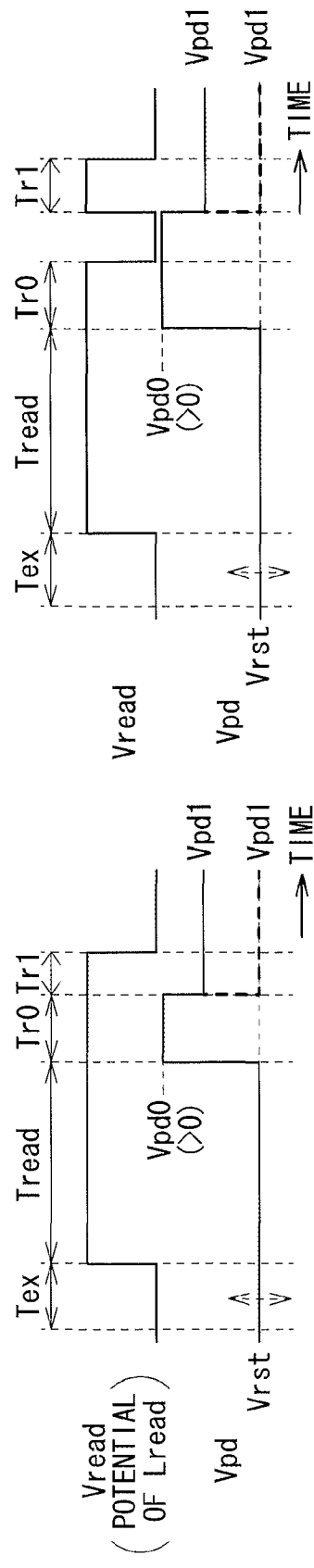
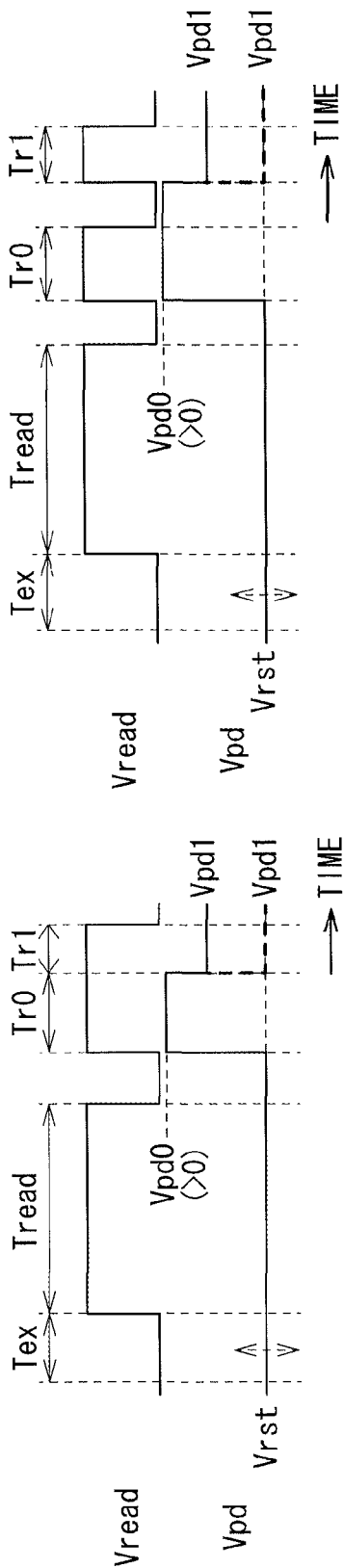
FIG. 8A
FIG. 8B
FIG. 8C
FIG. 8D PRE-RESET OPERATION BY FORWARD BIAS VOLTAGE (Vpd<0)
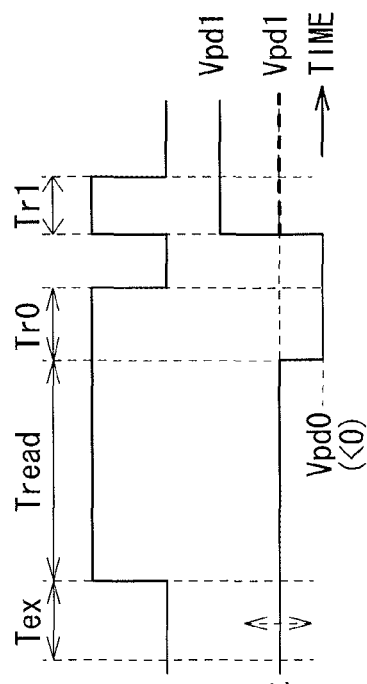
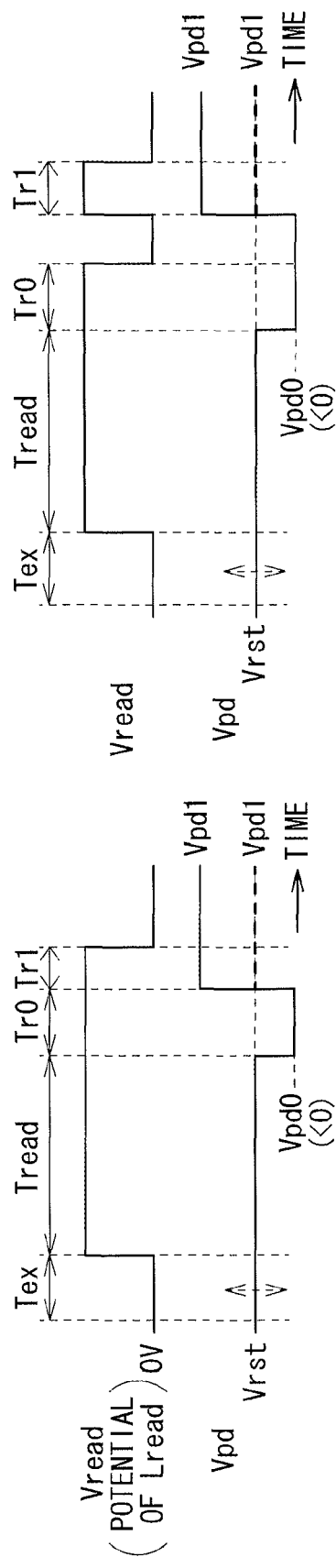
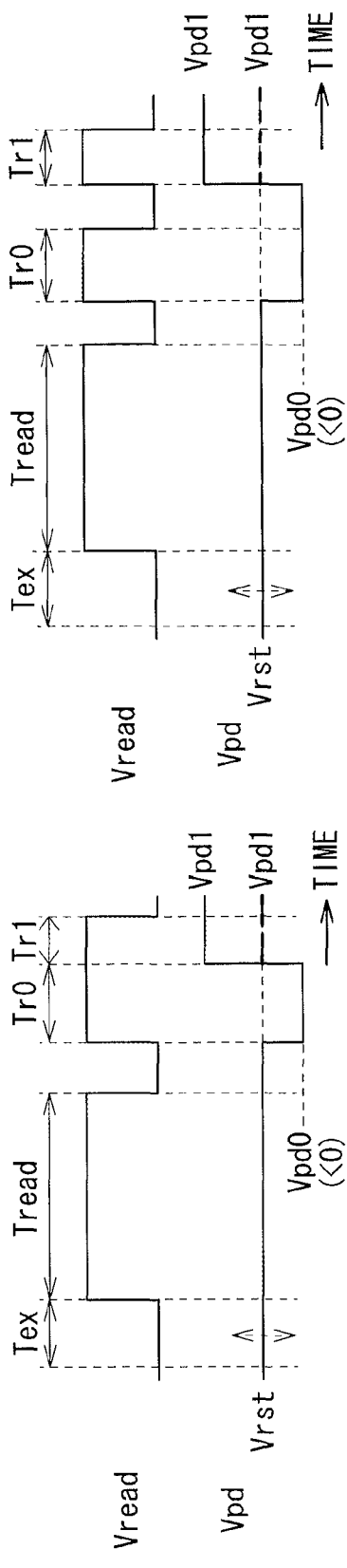
FIG. 11A
FIG. 11B
FIG. 11C
FIG. 11D

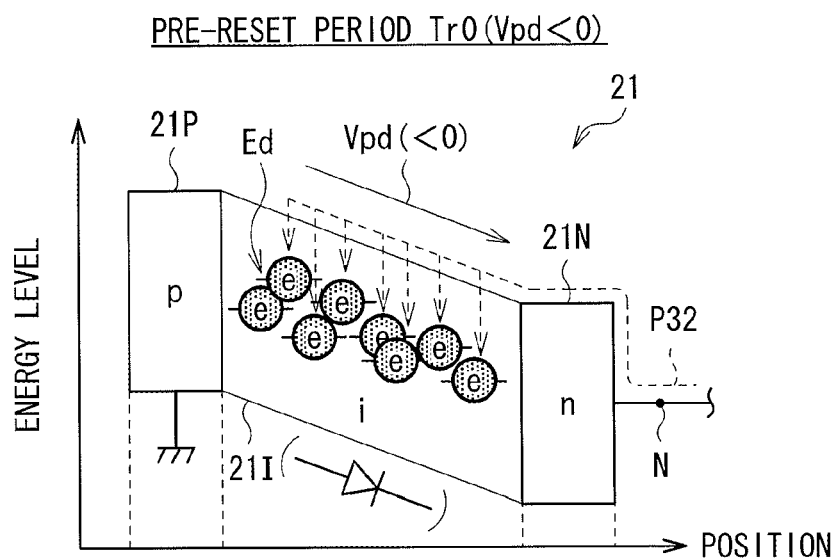
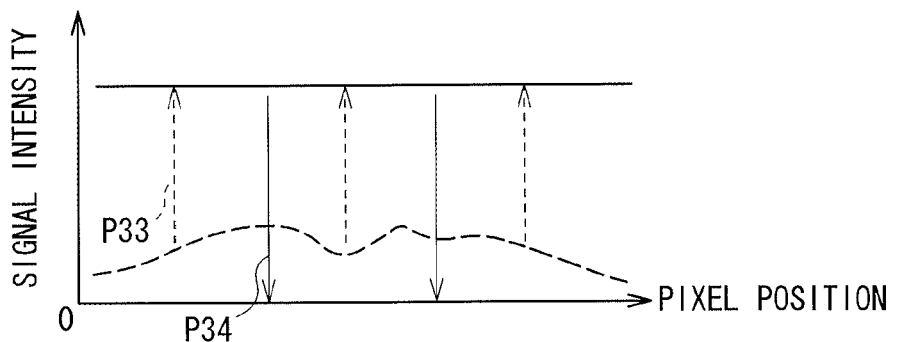

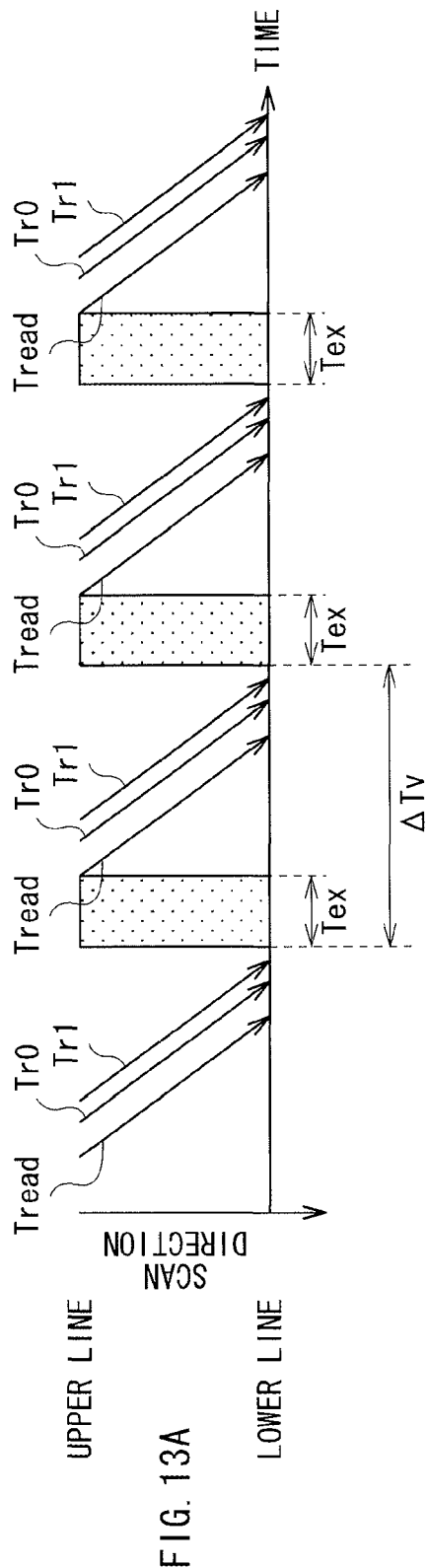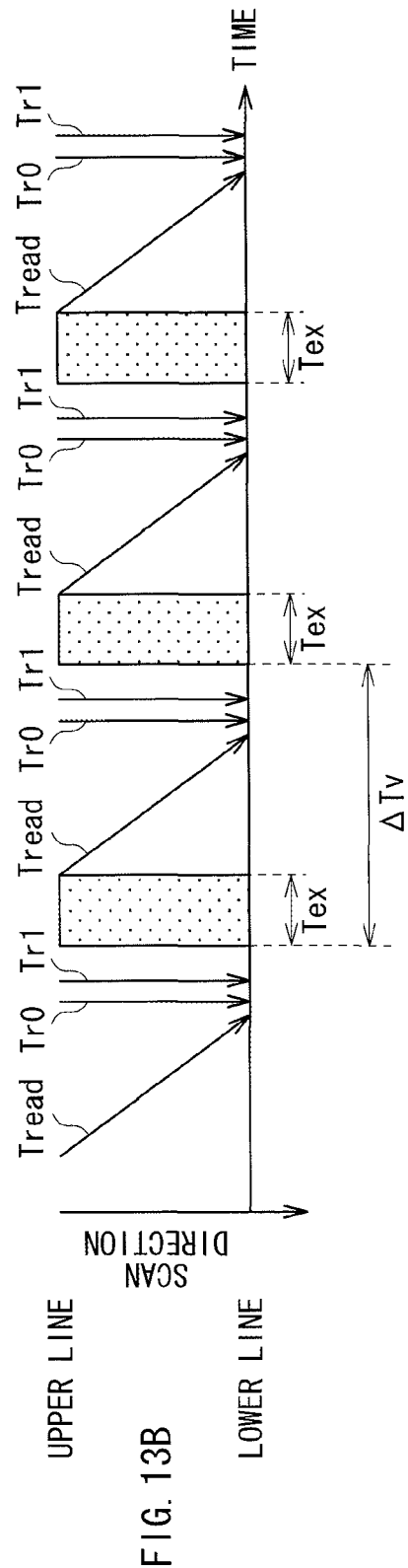

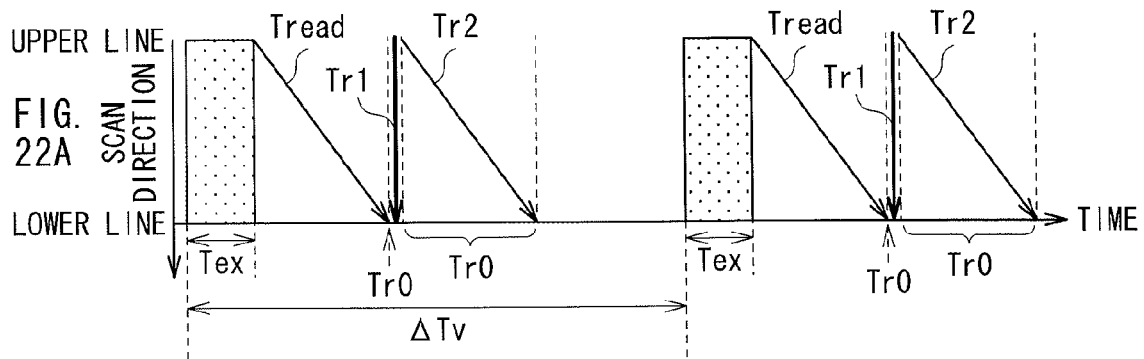
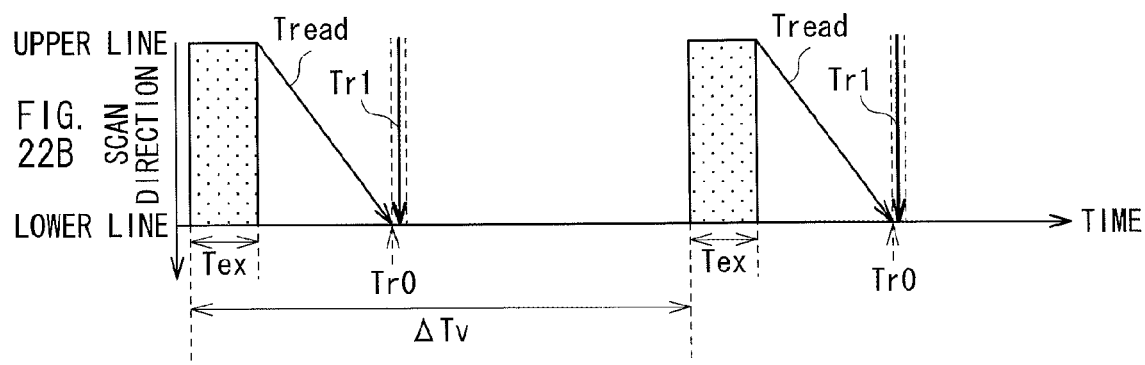
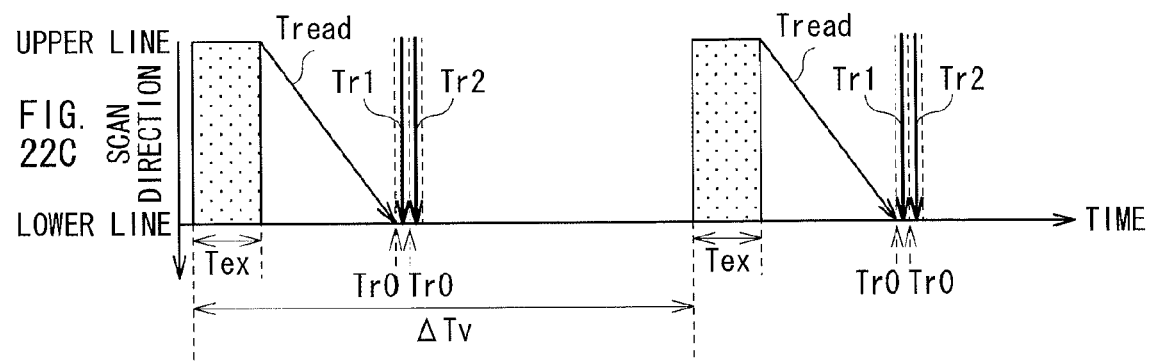

IMAGE PICKUP UNIT AND IMAGE PICKUP DISPLAY SYSTEM

BACKGROUND

This disclosure relates to an image pickup unit including a photoelectric conversion device, and to an image pickup display system provided with such an image pickup unit.

Previously, various kinds of image pickup units including a photoelectric conversion device in each pixel (each image-pickup pixel) have been proposed. For example, in Japanese Unexamined Patent Application Publication No. 2011-135561, a so-called optical touch panel, a radiation image pickup unit, and the like are described as an example of an image pickup unit having such a photoelectric conversion device.

SUMMARY

Incidentally, in the above-described image pickup unit, a plurality of pixels is driven to pick up an image (image-pickup drive is performed). Various kinds of techniques for achieving high image quality of picked-up images obtained in such a way have been proposed. However, an image pickup unit capable of achieving higher image quality is desirably proposed.

It is thus desirable to provide an image pickup unit capable of achieving high image quality of picked-up images, and an image pickup display system provided with such an image pickup unit.

According to an embodiment of the disclosure, there is provided an image pickup unit including: an image pickup section including a plurality of pixels, each of the pixels including a photoelectric conversion device; and a drive section driving each of the pixels to perform a readout operation, a pre-reset operation, and a main reset operation in this order, the readout operation being intended to read out charge from each of the pixels as a signal, the charge being obtained from the photoelectric conversion device, and the pre-reset operation and the main reset operation being intended to reset the charge in the each of the pixels. The drive section applies a voltage to the photoelectric conversion device, the voltage being different between in the pre-reset operation and in the main reset operation.

According to an embodiment of the disclosure, there is provided an image pickup display system including an image pickup unit and a display displaying an image based on an image pickup signal obtained from the image pickup unit. The image pickup unit includes: an image pickup section including a plurality of pixels, each of the pixels including a photoelectric conversion device; and a drive section driving each of the pixels to perform a readout operation, a pre-reset operation, and a main reset operation in this order, the readout operation being intended to read out charge from each of the pixels as a signal, the charge being obtained from the photoelectric conversion device, and the pre-reset operation and the main reset operation being intended to reset the charge in each of the pixels. The drive section applies a voltage to the photoelectric conversion device, the voltage being different between in the pre-reset operation and in the main reset operation.

In the image pickup unit and the image pickup display system according to the embodiments of the disclosure, each of pixels is driven to perform the readout operation, the pre-reset operation, and the main reset operation in this order. At this time, the voltage that is different between in the pre-reset operation and in the main reset operation is applied to the photoelectric conversion device. Accordingly, residual charge (remained amount of signal charge) in the pixels after the readout operation is reduced.

In the image pickup unit and the image pickup display system according to the embodiments of the disclosure, each of the pixels is driven to perform the readout operation, the pre-reset operation, and the main reset operation in this order. In addition, a voltage that is different between in the pre-reset operation and in the main reset operation is applied to the photoelectric conversion device. Therefore, the residual charge in each of the pixels after the readout operation is allowed to be reduced. Consequently, an afterimage caused by the residual charge is allowed to be suppressed, and high image quality of the picked-up image is achievable.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 8A to 8D are timing waveform charts each illustrating an example of a pre-reset operation, a main reset operation, and the like according to the embodiment.

FIGS. 11A to 11D are timing waveform charts each illustrating another example of the pre-reset operation, the main reset operation, and the like according to the embodiment.

FIGS. 12A and 12B are schematic diagrams for explaining functions in the pre-reset operation illustrated in FIGS. 11A to 11D.

FIGS. 13A and 13B are timing charts each illustrating an example of a line-sequential image-pickup operation according to the embodiment.

FIGS. 22A to 22C are timing charts each illustrating another example of the image-pickup drive according to the modification 6.

DETAILED DESCRIPTION

Hereinafter, a preferred embodiment of the disclosure will be described in detail with reference to drawings. Note that the descriptions will be given in the following order.
1. Embodiment (an example of supplying a reset voltage with use of a readout amplifier)
2. Modifications
  Modification 1 (an example of supplying a reset voltage through change-over switches and signal lines)
  Modification 2 (an example of supplying a reset voltage to a side opposite to a readout side of a photoelectric conversion device)
  Modification 3 (another configuration example of a passive pixel circuit)
  Modifications 4 and 5 (examples of an active pixel circuit)
  Modification 6 (another example of image-pickup drive)
  Modification 7 (another configuration example of a column selection section)
  Modifications 8 and 9 (examples of an image pickup section picking up an image based on a radiation)
3. Application example (an application example to an image pickup display system)
4. Other Modifications Embodiment General Configuration of Image Pickup Unit 1

Figure 1:
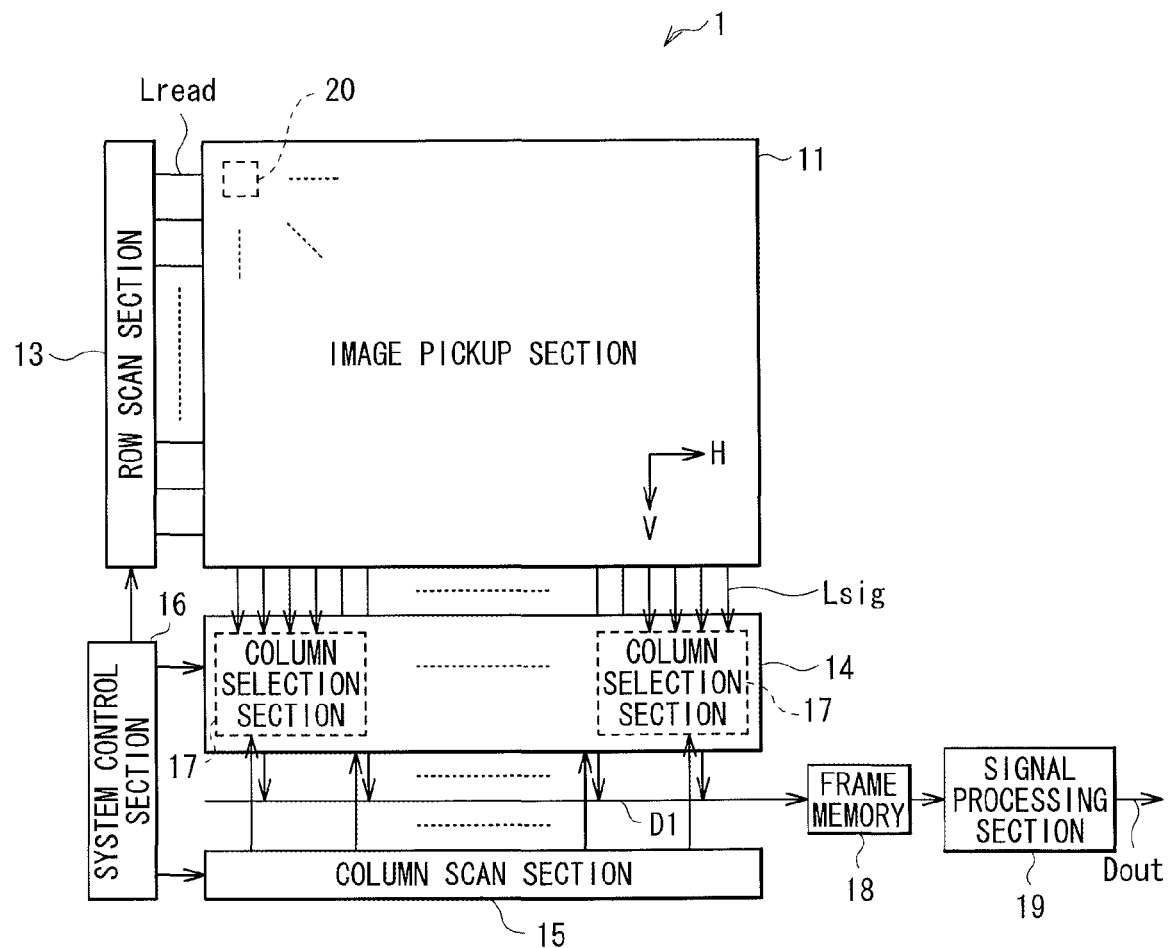
FIG. 1 is a block diagram illustrating a general configuration example of an image pickup unit according to an embodiment of the disclosure.

FIG. 1 illustrates a block configuration of an entire image pickup unit (an image pickup unit 1) according to an embodiment of the disclosure. The image pickup unit 1 reads out information of a subject (picks up an image of a subject) based on image-pickup light. The image pickup unit 1 includes an image pickup section 11, a row scan section 13, an A/D conversion section 14, a column scan section 15, a system control section 16, a frame memory 18, and a signal processing section 19. Of these sections, the row scan section 13, the A/D conversion section 14, the column scan section 15, and the system control section 16 correspond to a specific example of "drive section" of the disclosure.

(Image Pickup Section 11)

The image pickup section 11 generates an electrical signal based on incident image-pickup light (is an image pickup region). In the image pickup section 11, pixels (image-pickup pixels, unit pixels) 20 are two-dimensionally arranged in a matrix. Each of the pixels 20 has a photoelectric conversion section (a photoelectric conversion device 21 described later) which generates photocharge by a charge amount according to light quantity of the incident image-pickup light and stores the photocharge therein. Note that the description is given hereinafter on the assumption that a horizontal direction (a row direction) in the image pickup section 11 is "H" direction and a vertical direction (a column direction) is "V" direction, as illustrated in FIG. 1.

Figure 2:
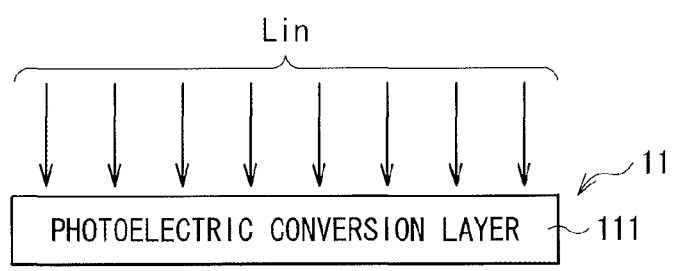
FIG. 2 is a schematic diagram illustrating a schematic configuration example of an image pickup section illustrated in FIG. 1.

FIG. 2 illustrates a schematic configuration example of the image pickup section 11. The image pickup section 11 is provided with a photoelectric conversion layer 111 in which the plurality of pixels 20 described above is arranged. In the photoelectric conversion layer 111, photoelectric conversion based on incident image-pickup light Lin (conversion from the image-pickup light Lin into signal charge) is performed as illustrated in the drawing.

Figure 3:
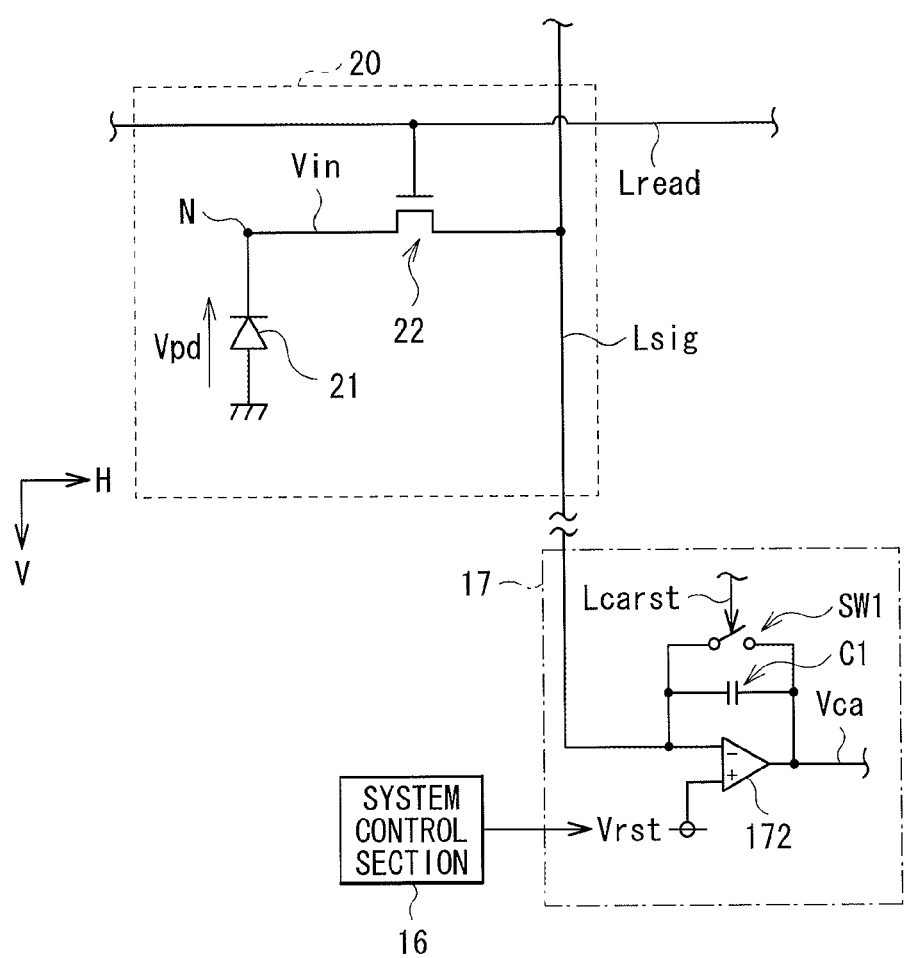
FIG. 3 is a circuit diagram illustrating a detailed configuration example of a pixel and the like illustrated in FIG. 1.

FIG. 3 illustrates a circuit configuration example of the pixel 20 (a circuit configuration example of a so-called passive type) together with a circuit configuration example of a column selection section 17 (described later) in the A/D conversion section 14. The passive pixel 20 includes one photoelectric conversion device 21 and one transistor 22. The pixel 20 is connected to a readout control line Lread extending along the H direction and a signal line Lsig extending along the V direction.

The photoelectric conversion device 21 is formed of a PIN (positive intrinsic negative) photodiode, for example, and generates signal charge by the charge amount corresponding to the light quantity of the incident light (the image-pickup light Lin) as described above. A cathode of the photoelectric conversion device 21 is connected to a storage node N, and an anode thereof is grounded. Note that in the following description, a potential difference (a voltage) between the anode and the cathode (between both ends) of the photoelectric conversion device 21 is referred to as an "inter-end voltage Vpd". Specifically, that means a potential on a signal readout side (the storage node N side, a cathode side herein) with reference to a side (herein, an anode side) opposite to the signal readout side.

The transistor 22 is a transistor (a readout transistor) which is turned on in response to a row scan signal supplied through the readout control line Lread, and accordingly outputs the signal charge (an input voltage Vin) obtained from the photoelectric conversion device 21 to the signal line Lsig. The transistor 22 is configured of an N-channel (N-type) field effect transistor (FET). Alternatively, the transistor 22 may be configured of a P-channel (P-type) FET or the like. The transistor 22 is also configured by using a silicon-based semiconductor such as microcrystalline silicon (Si) and polycrystalline silicon (polysilicon). Alternatively, the transistor 22 may be configured using an oxide semiconductor such as indium gallium zinc oxide (InGaZnO) and zinc oxide (ZnO). The microcrystalline silicon, the polycrystalline silicon, and the oxide semiconductor have a mobility u higher than that of amorphous silicon. This enables high speed readout of the signal charge by the transistor 22, for example.

In the pixel 20, a gate of the transistor 22 is connected to the readout control line Lread, a source thereof is connected to the signal line Lsig, and a drain thereof is connected to the cathode (the storage node N) of the photoelectric conversion device 21.

(Row Scan Section 13)

The row scan section 13 illustrated in FIG. 1 is a pixel drive section (a row scan circuit) including a shift resistor circuit, an address decoder, a logic circuit, and the like, which will be described later, and performs drive (line-sequential scanning) on a row basis (on a horizontal line basis) with respect to the plurality of pixels 20 in the image pickup section 11. Specifically, the row scan section 13 performs such line sequential scanning at the time of line sequential image-pickup drive such as line sequential readout drive and line sequential reset drive, which will be described later. Incidentally, the line sequential scanning is performed by supplying the row scan signal to each of the pixels 20 through the readout control line Lread.

(A/D Conversion Section 14)

As illustrated in FIG. 1, the A/D conversion section 14 has a plurality of column selection sections 17 each provided for a plurality of (four, herein) signal lines Lsig. The A/D conversion section 14 performs A/D conversion (analog-digital conversion) based on a signal voltage (signal charge) input through the signal lines Lsig. Output data (an image pickup signal D1) configured of a digital signal is accordingly generated and is output to the frame memory 18 and the signal processing section 19.

Figure 4:
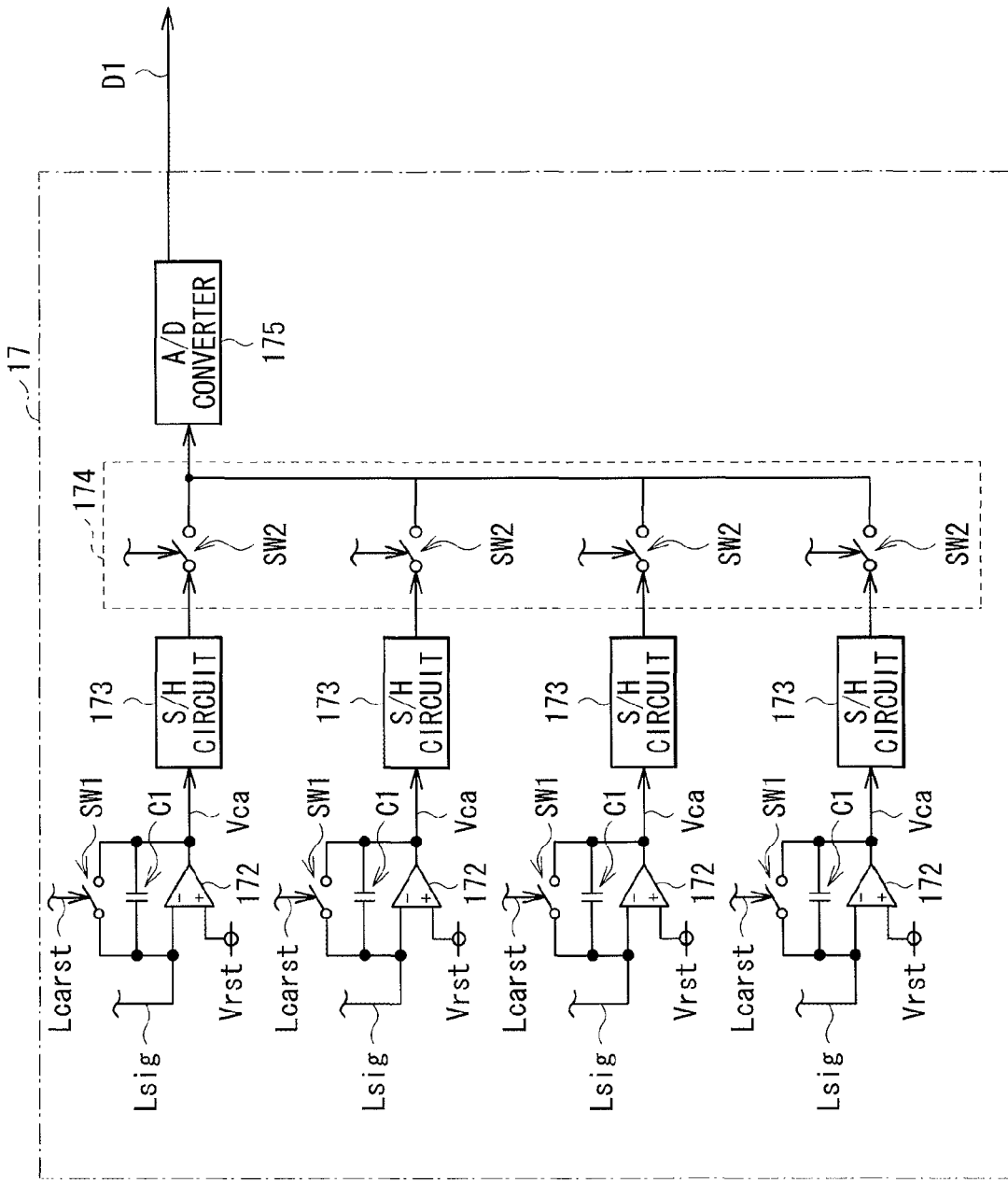
FIG. 4 is a block diagram illustrating a detailed configuration example of a column selection section illustrated in FIG. 1.

As illustrated in FIG. 3 and FIG. 4, for example, each of the column selection sections 17 has charge amplifiers 172, capacitors (feedback capacitors) C1, switches SW1, sample and hold (S/H) circuits 173, a multiplexer circuit (a selection circuit) 174 including four switches SW2, and an A/D converter 175. Of these components, the charge amplifier 172, the capacitor C1, the switch SW1, the S/H circuit 173, and the switch SW2 are provided one by one for every signal line Lsig, as illustrated in FIG. 4. On the other hand, the multiplexer circuit 174 and the A/D converter 175 are provided one for the entire column selection section 17.

The charge amplifier 172 is an amplifier for converting the signal charge read out from the signal line Lsig into a voltage (performing Q-V conversion). One end of the signal line Lsig is connected to an input terminal on a negative side (minus side) of the charge amplifier 172, and a predetermined reset voltage Vrst is input to an input terminal on a positive side (plus side) thereof. In addition, a feedback connection is established between an output terminal and the input terminal on the negative side of the charge amplifier 172 through a parallel connection circuit including the capacitor C1 and the switch SW1. In other words, a first terminal of the capacitor C1 is connected to the input terminal on the negative side of the charge amplifier 172, and a second terminal thereof is connected to the output terminal of the charge amplifier 172. Likewise, a first terminal of the switch SW1 is connected to the input terminal on the negative side of the charge amplifier 172, and a second terminal thereof is connected to the output terminal of the charge amplifier 172. Note that the on/off state of the switch SW1 is controlled by a control signal (an amplifier reset control signal) supplied from the system control section 16 through an amplifier reset control line Lcarst. Although the detail will be described later, the value of the above-described reset voltage Vrst is also controlled by the system control section 16. In this way, a charge amplifier circuit performing the above-described Q-V conversion is configured of the charge amplifier 172, the capacitor C1, and the switch SW1.

The S/H circuit 173 is disposed between the charge amplifier 172 and the multiplexer circuit 174 (the switch SW2), and is a circuit for temporarily holding an output voltage Vca from the charge amplifier 172.

The multiplexer circuit 174 is a circuit which selectively connects or disconnects between each of the S/H circuits 173 and the A/D converter 175 by allowing one of the four switches SW2 to be sequentially in on state in response to the scan drive by the column scan section 15.

The A/D converter 175 is a circuit generating and outputting the above-described output data Dout (the image pickup signal D1) by performing the A/D conversion on the output voltage from the S/H circuit 173, which is input through the switch SW2.

(Column Scan Section 15 and System Control Section 16)

The column scan section 15 includes a shift resistor, an address decoder, and the like (which are not illustrated), and sequentially drives the switches SW2 in the column selection section 17 while performing scanning. Through selective scanning by the column scan section 15, the signals (the image pickup signal D1) of the respective pixels 20 read out through the signal lines Lsig are sequentially output to the frame memory 18 and the signal processing section 19.

The system control section 16 controls operation of each of the row scan section 13, the A/D conversion section 14, and the column scan section 15. Specifically, the system control section 16 has a timing generator generating various kinds of timing signals (control signals) described above, and based on the various kinds of timing signals generated by the timing generator, performs drive control of the row scan section 13, the A/D conversion section 14, and the column scan section 15. In this way, the row scan section 13, the A/D conversion section 14, and the column scan section 15 each perform image-pickup drive (line-sequential image-pickup drive) with respect to the plurality of pixels 20 in the image pickup section 11, based on the control of the system control section 16, so that the output data (the image pickup signal D1) is provided from the image pickup section 11.

(Frame Memory 18 and Signal Processing Section 19)

The frame memory 18 is a memory section for temporarily holding the output data (the image pickup signal D1) from the A/D conversion section 14, and is configured using various kinds of memories such as a static random access memory (SRAM).

The signal processing section 19 performs predetermined signal processing based on the data (the image pickup signal D1) which is output from the A/D conversion section 14 and then temporarily held in the frame memory 18 to generate output data Dout (an output signal). Note that the detail of the signal processing by the signal processing section 19 will be described later.

[Functions and Effects of Image Pickup Unit 1]

(1. Basic Operation)

As illustrated in FIG. 2, in the image pickup unit 1, when image-pickup light Lin enters the image pickup section 11 in an exposure period Tex described later, the image-pickup light Lin is converted into signal charge (subjected to photoelectric conversion) in the photoelectric conversion layer 111 (the photoelectric conversion device 21 in each pixel 20 illustrated in FIG. 3). In the storage node N, voltage change occurs according to the storage node capacity by the signal charge generated by the photoelectric conversion. Specifically, when the storage node capacity is represented by Cs and the generated signal charge is represented by q, in the storage node N, the voltage is lowered by the amount of (q/Cs). In response to such a voltage change, an input voltage Vin (a voltage corresponding to the signal charge) is applied to the drain of the transistor 22. The charge of the input voltage Vin to be supplied to the transistor 22 is read out from the pixel 20 to the signal line Lsig when the transistor 22 becomes on state in response to a row scan signal supplied through the readout control line Lread (readout period Tread).

The signal charge thus read out is input to the column selection sections 17 in the A/D conversion section 14, for each of the plurality of (four, herein) pixel columns through the signal lines Lsig. In each of the column selection sections 17, first, the charge amplifier circuit configured of the charge amplifier 172 and the like performs Q-V conversion (converts the signal charge into a signal voltage) for the signal charge input from each of the signal lines Lsig. Subsequently, the A/D converter 175 performs A/D conversion for each of the converted signal voltages (the output voltage Vca from each of the charge amplifier circuits 172), through the S/H circuits 173 and the multiplexer circuits 174, to generate the output data (the image pickup signal D1) formed of the digital signals. In this way, the image pickup signal D1 is output sequentially from each of the column selection sections 17 and is transmitted to the frame memory 18 and the signal processing section 19. Then, the signal processing section 19 performs the predetermined signal processing with use of the image pickup signal D1 to generate eventual output data Dout, and outputs the output data Dout to the outside.

(2. Operation in Exposure Period Tex and in Readout Period Tread)

Figure 5A:
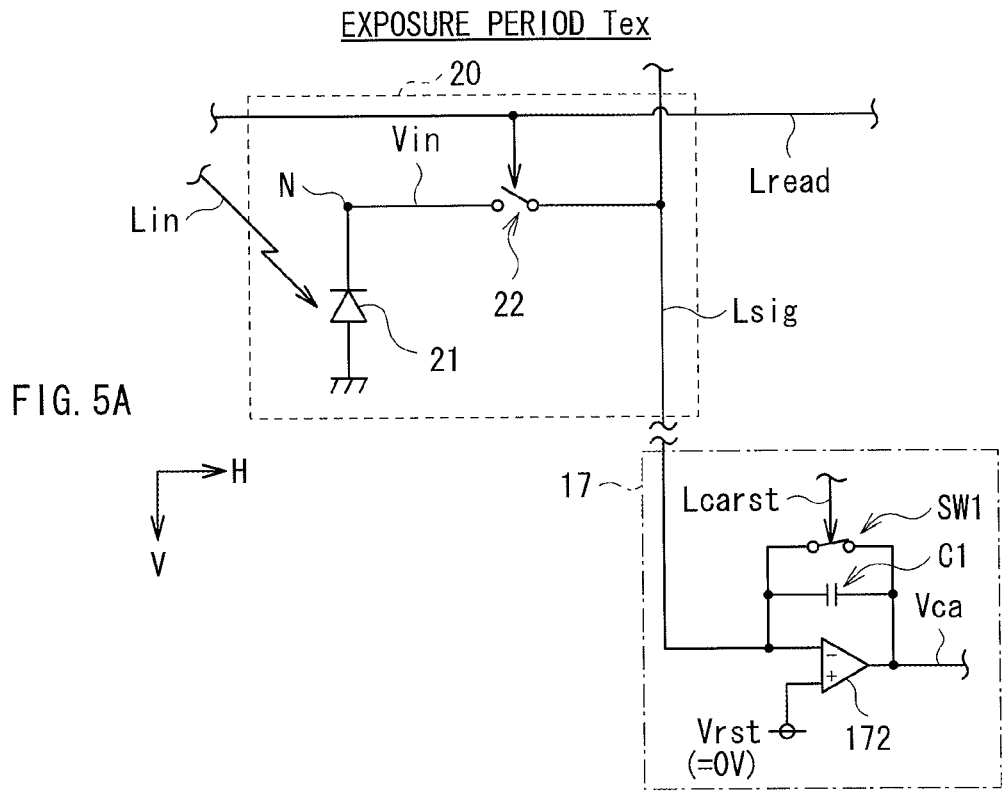
FIGS. 5A and 5B are circuit diagrams illustrating an example of operation state in an exposure period and in a readout period, respectively.
Figure 5B:
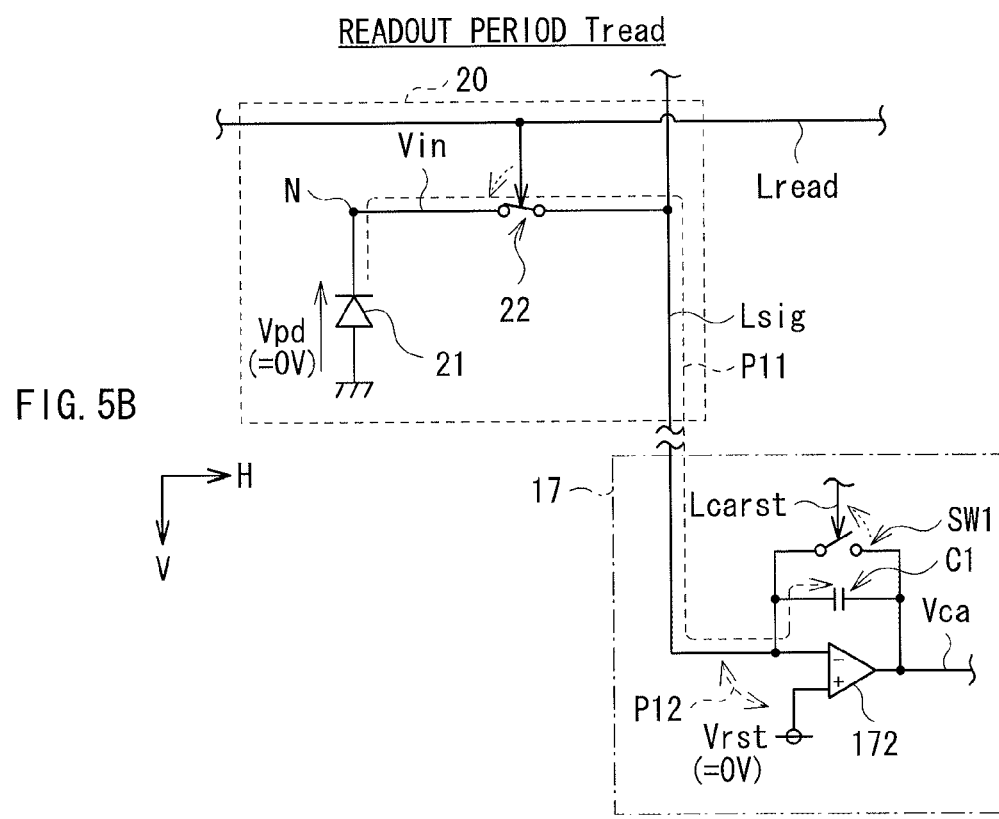

With referring to FIGS. 5A and 5B, the operation of the pixel 20 and the operation of the charge amplifier circuit in the column selection section 17 in the above-described exposure period Tex and in the above-described readout period Tread are described in detail. Note that the on/off state of the transistor 22 is illustrated with use of a switch for convenience of the description.

First, as illustrated in FIG. 5A, in the exposure period Tex in which the image-pickup light Lin enters the photoelectric conversion device 21 in the pixel 20, the transistor 22 is in the off state to prevent the signal charge stored in the storage node N from being output (read out) to the signal line Lsig during the exposure period Tex. Note that, since the charge amplifier circuit at this time is in a state where the predetermined amplifier reset operation (reset operation of the charge amplifier circuit) has been performed, the switch SW1 is in the on state, and as a result, a voltage follower circuit is formed. In addition, in the exposure period Tex, as illustrated in FIG. 5A, the reset voltage Vrst is equal to 0 V (ground potential). Incidentally, the reset voltage Vrst at this time is not limited to 0 V, and may be other potential. The same applies to the following.

On the other hand, in the readout period Tread, as illustrated in FIG. 5B, when the transistor 22 is turned on, the signal charge is read out from the storage node N in the pixel 20 to the signal line Lsig (see an arrow P11 in the FIG. 5B). The signal charge thus read out is input to the charge amplifier circuit. In this case, in the readout period Tread, the switch SW1 in the charge amplifier circuit is in the off state, and the charge amplifier circuit is in the readout operation state. Therefore, the signal charge input to the charge amplifier circuit is stored in the capacitor C1, and the signal voltage (the output voltage Vca) corresponding to the stored charge is output from the charge amplifier 172. In this way, the signal charge is converted into the signal voltage (Q-V conversion is performed) in the charge amplifier circuit. Incidentally, the charge stored in the capacitor C1 in this way is reset (amplifier reset operation is performed) by turning on the switch SW1 at the time of the amplifier reset operation described above.

As illustrated in FIG. 5B, also in the readout period Tread, the reset voltage Vrst is set to 0 V. In addition, as illustrated by an arrow P12 in FIG. 5B, the voltage on the input terminal side (the signal line Lsig side) on the negative side of the charge amplifier 172 is substantially equal to the reset voltage Vrst applied to the input terminal on the positive side, by the imaginary short phenomenon in the charge amplifier circuit (the charge amplifier 172). Accordingly, the storage node N in the pixel 20 is also equal to the reset voltage Vrst (=0 V) through the transistor 22. As a result, as illustrated in FIG. 5B, the inter-end voltage Vpd of the photoelectric conversion device 21 is equal to 0 V in the readout period Tread. Note that each of the reset voltage Vrst and the inter-end voltage Vpd of the photoelectric conversion device 21 is not limited to 0 V, and may be the other potential. The same applies to the following.

(3. Remaining of Signal Charge in Pixel 20 after Readout Operation)

In some cases, a part of the signal charge stored in the pixel 20 (the storage node N) is remained, even after the above-described readout operation is performed. If a part of the signal charge is remained in the pixel 20, an after image caused by the residual charge is generated at the time of the subsequent readout operation (at the time of image pickup in the subsequent frame period) and thus the quality of the picked-up image is deteriorated (a signal corresponding to the residual charge is added). The generation mechanism of the remaining of the signal charge (the residual charge) will be described below. Specifically, generation of the residual charge caused by a Decay current (described below) generated from the photoelectric conversion device 21 will be described below.

Figure 6:
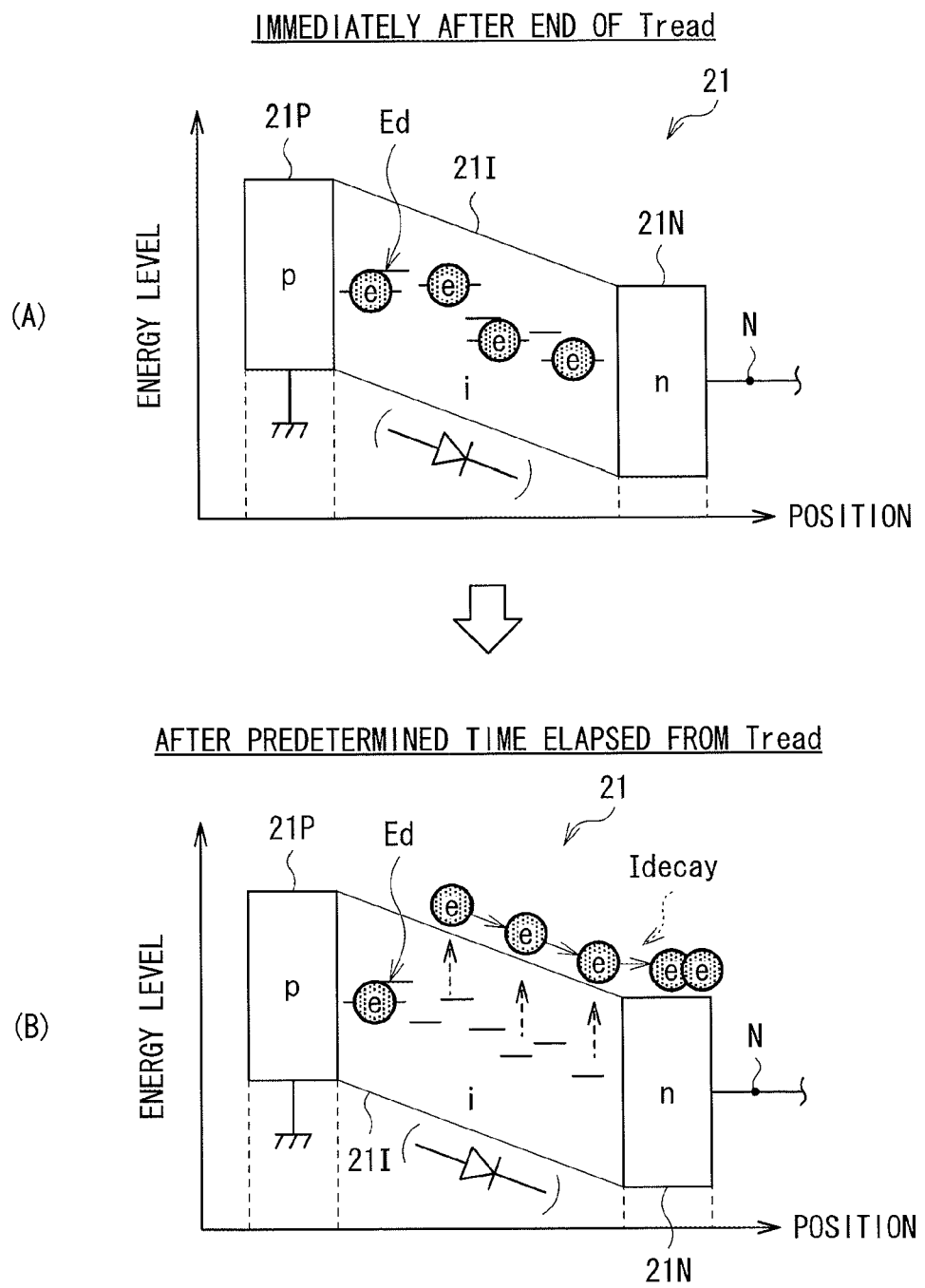
FIG. 6 is a schematic diagram for explaining a mechanism of occurrence of residual charge.

(A) and (B) of FIG. 6 schematically illustrate an energy band structure (a relationship between position of each layer and an energy level) in the case where the photoelectric conversion device 21 is a PIN photodiode (a thin film photodiode). Specifically, in this example, the photoelectric conversion device 21 has a p-type semiconductor layer 21P disposed on an anode side (the ground side), an n-type semiconductor layer 21N disposed on a cathode side (the storage node N side), and an intrinsic semiconductor layer (i layer) 21I formed between the p-type semiconductor layer 21P and the n-type semiconductor layer 21N.

It is known from the drawings that the intrinsic semiconductor layer 21I includes a large number of defect levels Ed. As illustrated in (A) of FIG. 6, the charge e is trapped by the defect level Ed immediately after the readout period Tread is ended. For example, as illustrated in (B) of FIG. 6, however, after a certain time is elapsed from the readout period Tread, the charge e trapped in the defect level Ed is released from the intrinsic semiconductor layer 21I to the outside (the storage node N side) of the photoelectric conversion device 21 (see arrows in the drawing). Accordingly, the above-described Decay current Idecay is generated from the photoelectric conversion device 21, and as a result, a part of the signal charge is remained in the pixel 20 (the residual charge is generated).

Figure 7:
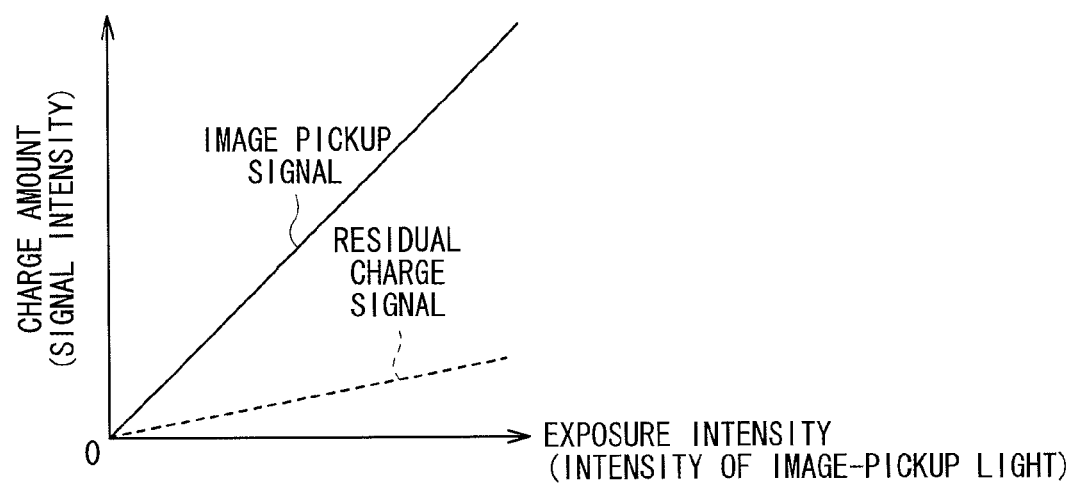
FIG. 7 is a characteristic diagram schematically illustrating an example of a relationship between exposure intensity and a charge amount in each of an image pickup signal and a residual charge signal.
Figure 9:
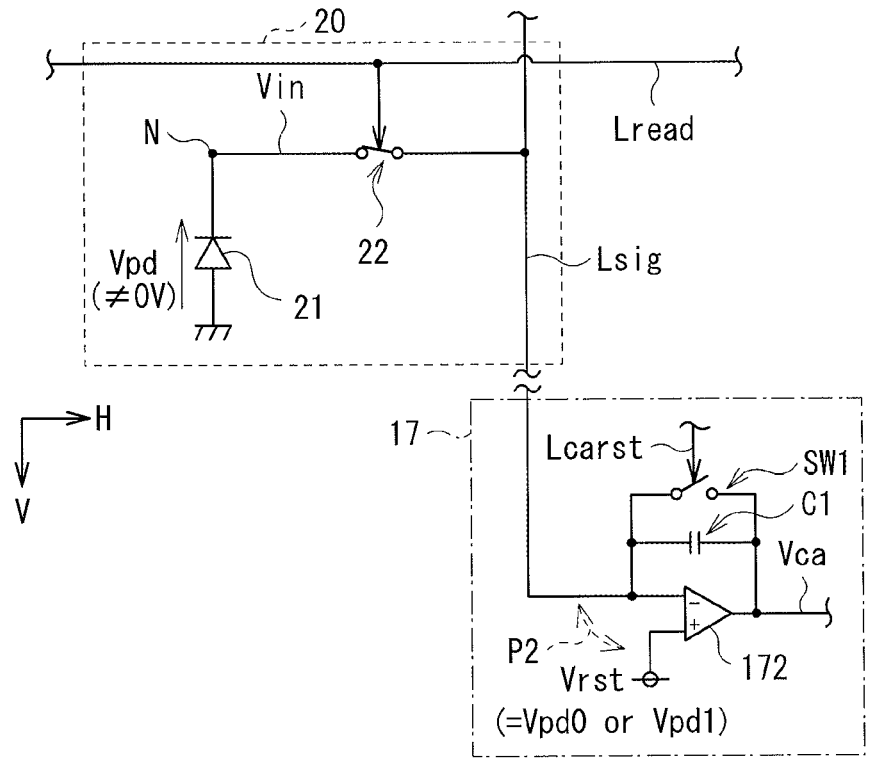
FIG. 9 is a circuit diagram illustrating an example of an operation state in a pre-reset period and a main reset period.

Incidentally, for example, as illustrated in FIG. 7, an exposure intensity to the image pickup section 11 at the time of image pickup (the intensity of the image-pickup light Lin) is proportional to (linearly related to) the signal intensity of each of the signals (the image pickup signal and the residual charge signal) corresponding to each of the charge amounts (the signal charge amount and the residual charge amount). In other words, the image pickup signal and the residual charge signal are respectively linearly increased in response to an increase of the exposure intensity.

(4. Function of Reducing Residual Charge using Pre-reset Operation and the Like)

In the embodiment, as illustrated in FIG. 8A to FIG. 13B, for example, the predetermined reset operation (a pre-reset operation and a main reset operation described below) is performed after the readout period Tread to reduce the above-described residual charge, and thus an after image caused by the residual charge is suppressed. Hereinafter, the function of reducing the residual charge using such a pre-reset operation and the like will be described in detail.

Incidentally, the pre-reset operation is roughly classified into two methods, namely, a pre-reset operation (a first method) using a reverse bias voltage (the inter-end voltage Vpd of the photoelectric conversion device 21 is larger than 0) and a pre-reset operation (a second method) using a forward bias voltage (the inter-end voltage Vpd is smaller than 0). Therefore, the two methods will be described in order below.

(First Method: Pre-Reset Operation and the Like Using Reverse Bias Voltage)

FIGS. 8A to 8D each illustrate a timing waveform example at the time of pre-reset operation and the like based on the above-described first method. Specifically, a timing waveform of each of the potential Vread of the readout control line Lread and the inter-end voltage Vpd (the reset voltage Vrst) of the photoelectric conversion device 21 is illustrated along the timing order (a time axis) of the exposure period Tex, the readout period Tread, the pre-reset period Tr0, and the main reset period Tr1. Note that in FIGS. 8A to 8D, a case where the inter-end voltage Vpd is equal to the reset voltage Vrst in the exposure period Tex is illustrated as an example. However, as described above with reference to FIG. 7, the signal intensity (the inter-end voltage Vpd) at this time is varied according to the exposure intensity (see dashed arrows in FIGS. 8A to 8D). The same applies to FIGS. 11A to 11D described later.

First, in the first method, as illustrated in FIGS. 8A to 8D, the pre-reset period Tr0 and the main reset period Tr1 during which the charge in the pixel 20 is reset are set in this order after the exposure period Tex and the readout period Tread. Then, the reset voltage (the inter-end voltage Vpd) which is different between in the pre-reset period Tr0 and the main reset period Tr1 is applied to the photoelectric conversion device 21. Specifically, as illustrated in the drawings, the inter-end voltage Vpd is set to Vpd) in the pre-reset period Tr0, and is set to Vpd1 in the main reset period Tr1. Note that as described above, the inter-end voltage Vpd is set to Vrst as an example in each of the exposure period Tex and the readout period Tread.

Herein, the reset operation (the pre-reset operation and the main reset operation) means that the inter-end voltage Vpd of the photoelectric conversion device 21 is controlled to be a predetermined value. In particular, in the embodiment, the reset voltage Vrst which is different between in the pre-reset period Tr0 and in the main reset period Tr1 is supplied to the terminal (in this case, the cathode) on the readout side (the storage node N side) of the photoelectric conversion device 21. Therefore, the inter-end voltage Vpd is controlled as described above. Moreover, in the embodiment, the reset voltage Vrst is supplied to the terminal on the readout side of the photoelectric conversion device 21 by the imaginary short phenomenon in the charge amplifier 172 (the charge amplifier circuit) (for example, see a reference symbol P2 in FIG. 9).

In particular, in the first method, the reverse bias voltage (a voltage in which a potential on the cathode side is set to be higher than that on the anode side) is applied between both ends of the photoelectric conversion device 21 in the pre-reset period Tr0. In other words, as for the inter-end voltage Vpd, Vpd=Vpd0>0 is established in the pre-reset period Tr0.

Figure 10:
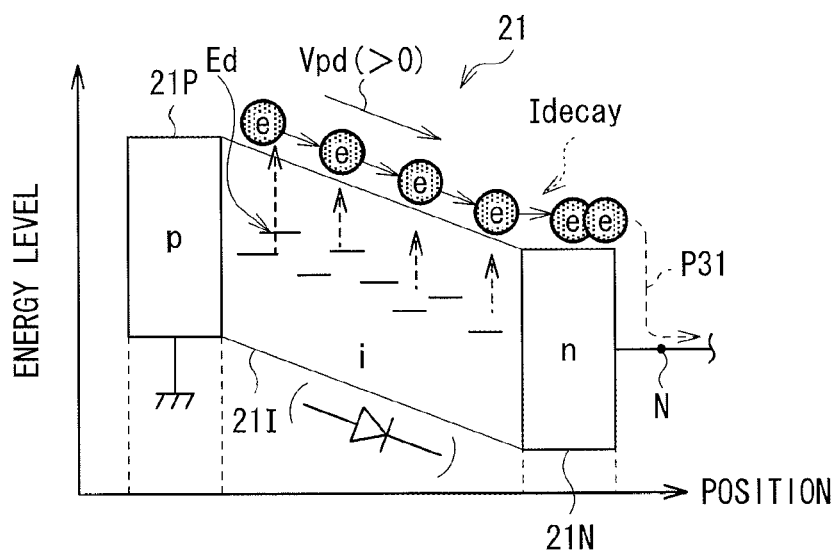
FIG. 10 is a schematic diagram for explaining functions in the pre-reset operation illustrated in FIGS. 8A to 8D.

Accordingly, for example, as schematically illustrated in FIG. 10, the charge e trapped in the defect level Ed in the intrinsic semiconductor layer 21I in the photoelectric conversion device 21 is released to the outside (herein, on the storage node N side) of the photoelectric conversion device 21 in the readout period Tread (see an arrow P31 in the drawing). In other words, the residual charge is extracted to the outside and thus is reduced. As a result, generation of an after image caused by the residual charge (reduction in the quality of the picked-up image in a subsequent frame) is suppressed.

Incidentally, the readout period Tread, the pre-reset period Tr0, and the main reset period Tr1 may be set as the continuous period or may be set with predetermined intervals, as illustrated in FIGS. 8A to 8D, for example. In addition, for example, as illustrated by a dashed waveform in FIGS. 8A to 8B, the inter-end voltage Vpd (Vpd1) in the main reset period Tr1 may be equal to the inter-end voltage Vpd (Vrst) in the readout period Tread.

(Second Method: Pre-Reset Operation and the Like Using Forward Bias Voltage)

FIGS. 11A to 11D each illustrate a timing waveform example at the time of the pre-reset operation and the like based on the second method. Specifically, the timing waveform of each of the potential Vread of the readout control line Lread and the inter-end voltage Vpd (the reset voltage Vrst) of the photoelectric conversion device 21 is illustrated along the timing order (a time axis) of the exposure period Tex, the readout period Tread, the pre-reset period Tr0, and the main reset period Tr1.

In the second method, similarly to the first method, as illustrated in FIGS. 11A to 11D, the pre-reset period Tr0 and the main reset period Tr1 are set in this order after the exposure period Tex and the readout period Tread. Then, the reset voltage (the inter-end voltage Vpd) which is different between in the pre-reset period Tr0 and in the main reset period Tr1 is applied to the photoelectric conversion device 21. Specifically, as illustrated in the drawings, the inter-end voltage Vpd is set to Vpd0 in the pre-reset period Tr0, and is set to Vpd1 in the main reset period Tr1. Note that, also in this case, the inter-end voltage Vpd is set to Vrst as an example in each of the exposure period Tex and the readout period Tread.

Moreover, similarly to the first method, the reset voltage Vrst which is different between in the pre-reset period Tr0 and in the main reset period Tr1 is supplied to the terminal on the readout side (the storage node N side) of the photoelectric conversion device 21. As a result, the inter-end voltage Vpd is controlled as described above. Specifically, herein, the reset voltage Vrst is supplied to the terminal on the readout side of the photoelectric conversion device 21 by the imaginary short phenomenon in the charge amplifier 172 (the charge amplifier circuit) (for example, see the reference symbol P2 in FIG. 9 described above).

Incidentally, in the second method unlike the first method, a forward bias voltage (a voltage in which the potential on the cathode side is set to be lower than that on the anode side) is applied between both ends of the photoelectric conversion device 21 in the pre-reset period Tr0. In other words, in this case, as for the inter-end voltage Vpd, Vpd=Vpd0<0 is established in the pre-reset period Tr0.

Accordingly, for example, as schematically illustrated in FIG. 12A, in the intrinsic semiconductor layer 21I in the photoelectric conversion device 21, the charge e is injected from the outside (herein, on the storage node N side) into defect level Ed which does not trap the charge e, to be trapped (see the arrow P32 in the drawing). Specifically, contrary to the first method, the variation of the residual charge according to the intensity of the image-pickup light Lin between the photoelectric conversion devices 21 (between the pixels 20) is suppressed (is desirably eliminated) by injecting charge e into each of the defect level Ed. Therefore, a uniform after image is added to the entire picked-up image. In other words, the in-plane variation of the residual charge signal is suppressed (uniformalization of the in-plane distribution is achieved).

Therefore, in the second method, for example, as illustrated in FIG. 12B, the following processing (analog processing, processing by software, and the like) is performed in the signal processing section 19, together with the application operation of the forward bias voltage in the pre-reset period Tr0. Specifically, subtraction processing (subtraction arithmetic processing of the residual charge signal) common to the pixels 20 is performed with respect to the image pickup signal D1 which is obtained by a readout operation subsequent to the pre-reset operation using the forward bias voltage. In detail, in a subsequent frame, the residual charge signal which allows the signal intensity in each of the pixels 20 to be uniform is added to the image pickup signal D1 through the pre-reset operation using the forward bias voltage (see an arrow P33 in the drawing). Therefore, to subtract the residual charge signal, the subtraction processing common to the pixels 20 is performed. Consequently, with use of the second method as of the first method, generation of an after image caused by the residual charge (reduction in the quality of the picked-up image in the subsequent frame) is suppressed, as illustrated by an arrow P34 in the drawing, for example.

Incidentally, with use of the second method as of the first method, the readout period Tread, the pre-reset period Tr0, the main reset period Tr1 may be set as a continuous period or may be set with predetermined intervals, as illustrated in FIGS. 11A to 11D, for example. Moreover, for example, as illustrated by a dashed waveform in FIGS. 11A to 11D, the inter-end voltage Vpd (Vpd1) in the main reset period Tr1 may be equal to the inter-end voltage Vpd (Vrst) in the readout period Tread.

As described above, in the embodiment, the pre-reset period Tr0 and the main reset period Tr1 are arranged in this order after the exposure period Tex and the readout period Tread. Then, the reset voltage (the inter-end voltage Vpd) which is different between in the pre-reset period Tr0 and in the main reset period Tr1 is applied to the photoelectric conversion device 21. As a result, the residual charge (the residual amount of the signal charge) in the pixel 20 after the readout period Tread is reduced.

Note that the pre-reset period Tr0 and the main reset period Tr1 illustrated in FIGS. 8A to 8D and FIGS. 11A to 11D may be set, for example, within one vertical period (one frame period), or may be set within one horizontal period.

Moreover, for example, as illustrated in FIGS. 13A and 13B, each of the pre-reset period Tr0 and the main reset period Tr1 may be set as a line-sequential operation with respect to the respective pixels 20, or may be set at the same timing with respect to the respective pixels 20.

As described above, in the embodiment, the pixels 20 are driven so that the readout operation, the pre-reset operation, and the main reset operation are performed in this order, and the reset voltage (the inter-end voltage Vpd) which is different between in the pre-reset operation and in the main reset operation is applied to the photoelectric conversion device 21. As a result, the residual charge in the respective pixels 20 after the readout operation is allowed to be reduced. Consequently, an after image caused by such a residual charge is suppressed, and high image quality of the picked-up image is achievable.

Moreover, it becomes possible to resolve the saturation state in the photoelectric conversion device 21 (to maintain high response speed of the photoelectric conversion device 21) and to pickup a picture at high speed.

Modifications

Subsequently, modifications (modifications 1 to 9) of the above-described embodiment will be described. Note that like numerals are used to designate substantially like components in the embodiment, and the description thereof is appropriately omitted.

[Modification 1]
(Configuration of Column Selection Section)

Figure 14A:
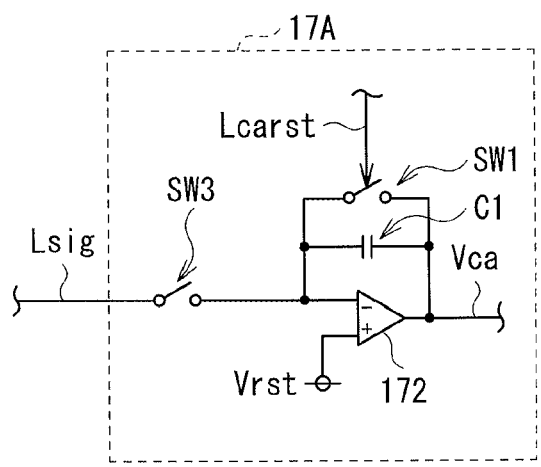
FIGS. 14A and 14B are circuit diagrams each illustrating a configuration example of a column selection section according to a modification 1.
Figure 14B:
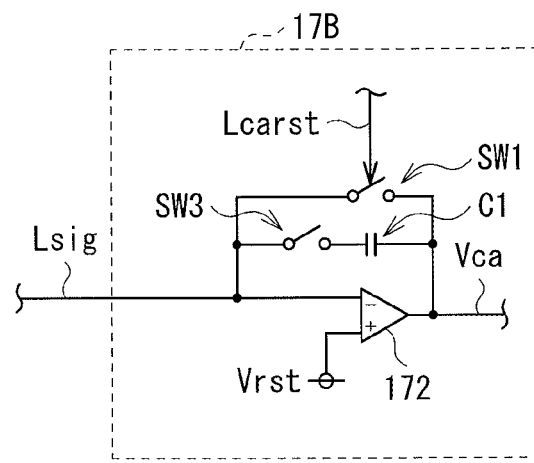

FIGS. 14A and 14B each illustrate a circuit configuration of a column selection section (column selection sections 17A and 17B) according to the modification 1. Each of the column selection sections 17A and 17B has a configuration in which a switch SW3 is further added to the column selection section 17 of the embodiment.

Specifically, in the column selection section 17A illustrated in FIG. 14A, the switch SW3 is provided on the signal line Lsig (between the signal line Lsig and the input terminal on the negative side of the charge amplifier 172). In the column selection section 17B illustrated in FIG. 14B, the switch SW3 is provided between the input terminal on the negative side of the charge amplifier 172 and the capacitor C1.

Such a switch SW3 is provided, taking into account supply of the reset voltage (inter-end voltages Vpd0 and Vpd1) to the signal line Lsig, which will be described below. Specifically, the connection between the signal line Lsig and the charge amplifier 172 is disconnectable using the switch SW3 so that the voltage of the signal line Lsig is prevented from following the voltage of the terminal on the positive side of the charge amplifier 172 by the above-described imaginary short phenomenon.

(Configuration and Function of Supply Section of Reset Voltage)

Figure 15:
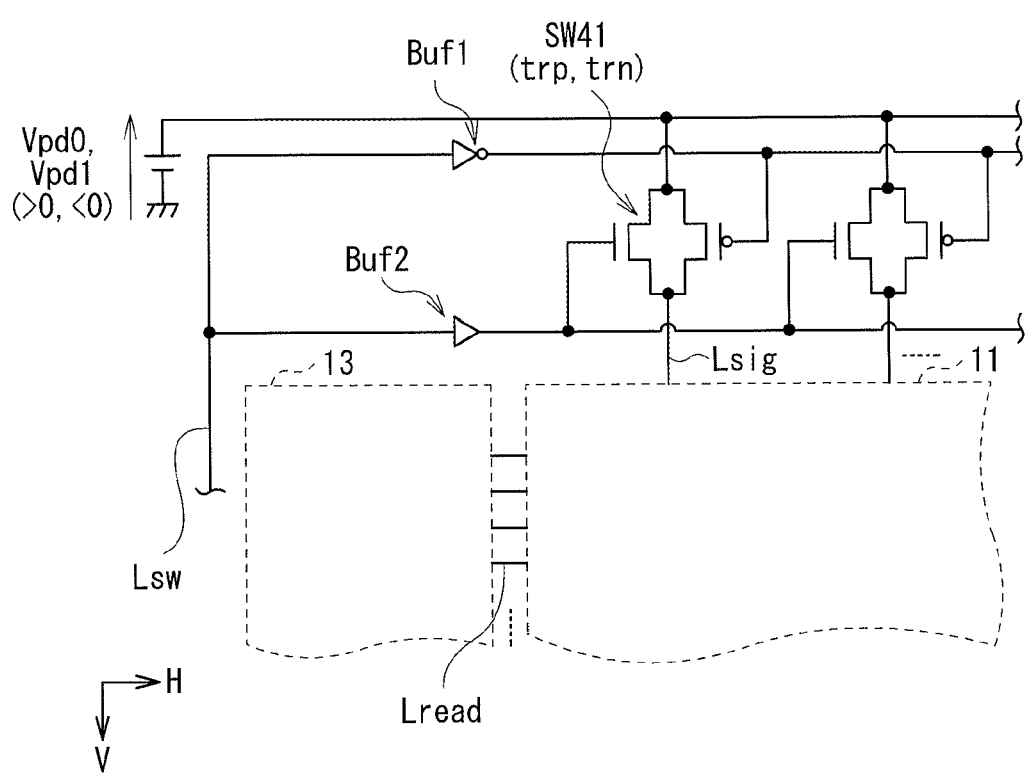
FIG. 15 is a circuit diagram illustrating a configuration example of a reset-voltage supply section according to the modification 1.

FIG. 15 is a circuit diagram illustrating a configuration example of a supply section of the reset voltage (the inter-end voltages Vpd0 and Vpd1) according to the modification 1. In the modification 1, as the supply section of the reset voltage, two buffer circuits Buf1 and Buf2 and a switch SW41 which is disposed on each signal line Lsig are provided in the peripheral region of the image pickup section 11 and the row scan section 13.

The buffer circuit Buf1 is disposed on a switch control line Lsw for controlling on/off state of each switch SW41, and functions as a buffer while performing logical inversion of a signal transmitted through the switch control line Lsw. The buffer circuit Buf2 is also disposed on the switch control line Lsw, and functions as a buffer without performing logical inversion of a signal transmitted through the switch control line Lsw.

The switch SW41 is an analog switch configured of a pair of a p-type transistor trp and an n-type transistor trn, and switches the connection state between the supply line of the reset voltage (the inter-end voltages Vpd0 and Vpd1) and each of the signal lines Lsig. In other words, the switch SW41 is a switch changing over the supply or not of the reset voltage to each of the signal lines Lsig. In each switch SW41, the switch control line Lsw is connected to a gate of the p-type transistor trp through the buffer circuit Buf2, and the switch control line Lsw is connected to a gate of the n-type transistor trn through the buffer circuit Buf1. In addition, one of a source and a drain of each of the transistors trp and trn is connected to a supply line of the reset voltage, and the other of the source and the drain is connected to the signal line Lsig.

With this configuration, in the modification 1, similarly to the above-described embodiment, the reset voltage (the inter-end voltages Vpd0 and Vpd1) which is different between in the pre-reset period Tr0 and in the main reset period Tr1 is supplied to the terminal on the readout side (the storage node N side) of the photoelectric conversion device 21 in each pixel 20. However, unlike in the embodiment, the reset voltage (the reverse bias voltage or the forward bias voltage) is supplied to the terminal on the readout side of the photoelectric conversion device 21 in each pixel 20 through the switch SW41 and the signal line Lsig.

Figure 16A:
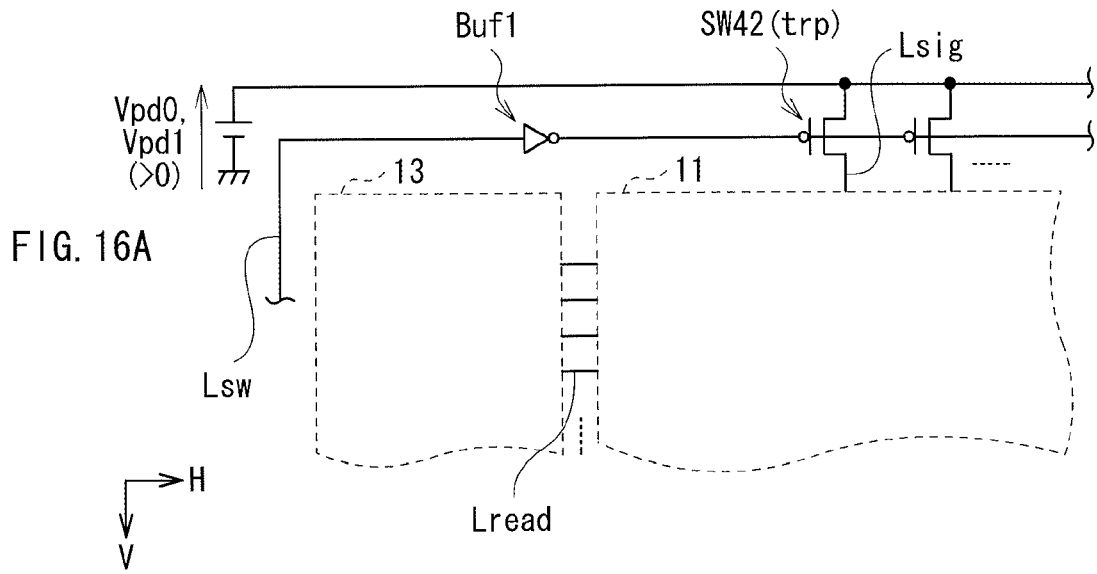
FIGS. 16A and 16B are circuit diagrams each illustrating another configuration example of the reset-voltage supply section according to the modification 1.
Figure 16B:
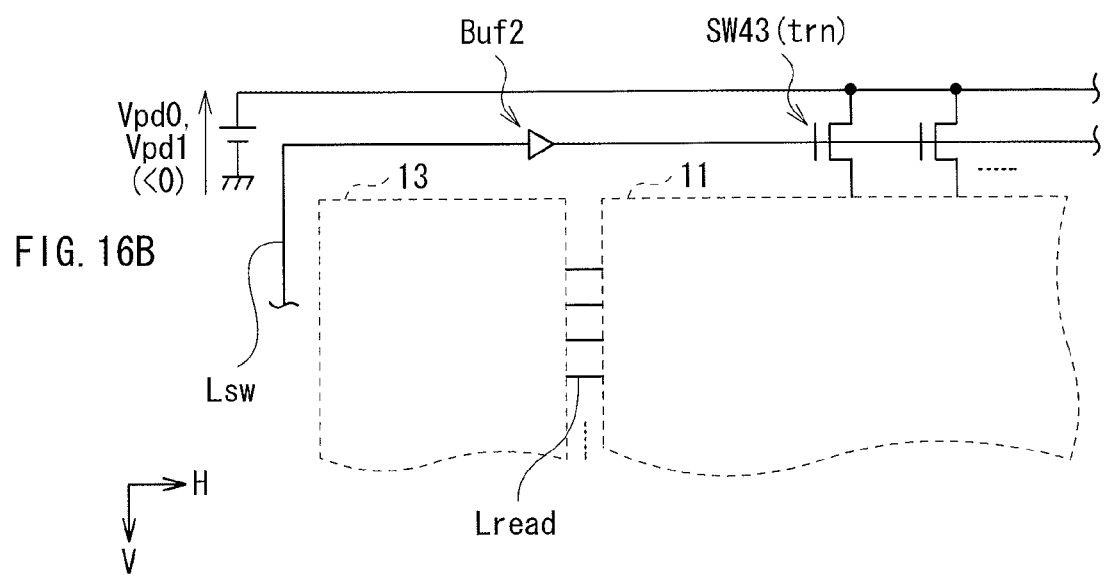

Note that, for example, as illustrated in FIGS. 16A and 16B, when the voltage range of the reset voltage (the inter-end voltages Vpd0 and Vpd1) is set narrow (set to a positive voltage or a negative voltage), it is not necessary to provide the p-type or the n-type transistor, unlike the switch SW41.

Specifically, in the example illustrated in FIG. 16A, the reset voltage (the inter-end voltages Vpd0 and Vpd1) is set to a positive voltage (>0). Therefore, a switch SW42 configured of only the p-type transistor trp is provided instead of the switch SW41. Moreover, only the buffer circuit Buf1 is disposed on the switch control line Lsw, and the switch control line Lsw is connected to the gate of the transistor trp through only the buffer circuit Buf1.

On the other hand, in the example illustrated in FIG. 16B, the reset voltage (the inter-end voltages Vpd0 and Vpd1) is set to a negative voltage (<0). Therefore, a switch SW43 configured of only the n-type transistor trn is disposed instead of the switch SW41. Moreover, only the buffer circuit Buf2 is disposed on the switch control line Lsw, and the switch control line Lsw is connected to the gate of the transistor trn through only the buffer circuit Buf2.

In the modification 1 having such a configuration, the reset voltage (the inter-end voltage Vpd) which is different between in the pre-reset period Tr0 and in the main reset period Tr1 is applied to the photoelectric conversion device 21 so that effects similar to those in the embodiment are obtainable. In other words, an after image caused by the residual charge is suppressed, and high image quality of the picked-up image is achievable. Note that each of the switches SW41, SW42, and SW43 may not be provided depending on the case.

[Modification 2]

Figure 17:
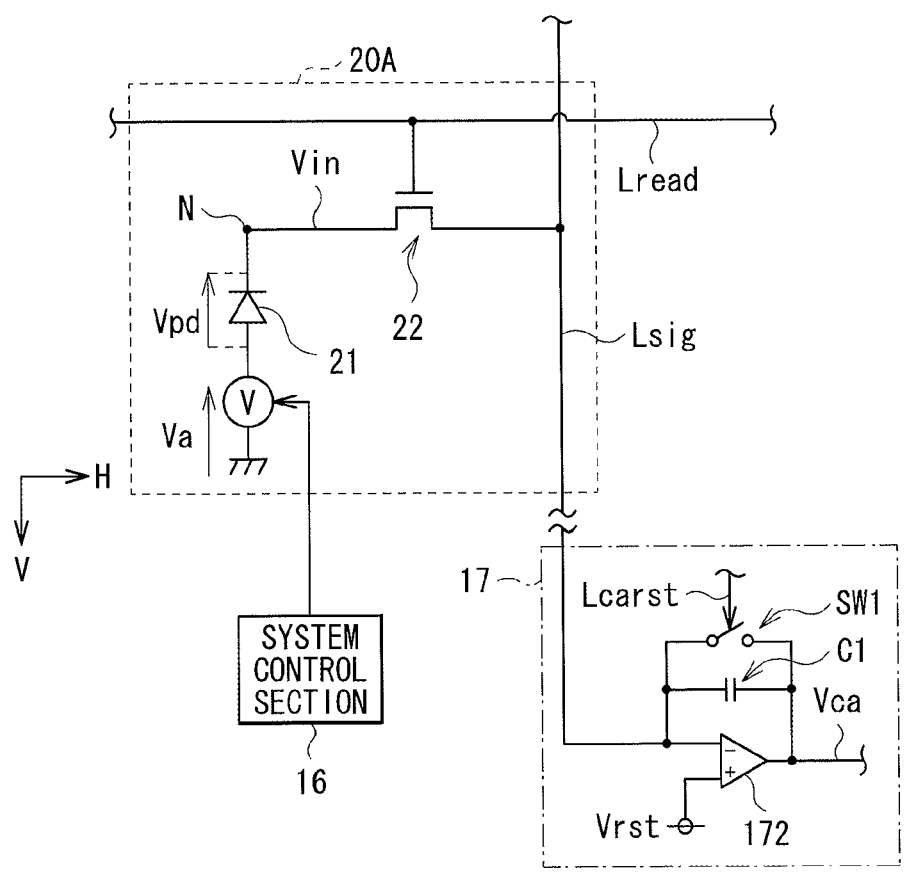
FIG. 17 is a circuit diagram illustrating a configuration of a pixel and the like according to a modification 2.

FIG. 17 illustrates a circuit configuration of a pixel (a pixel 20A) according to the modification 2 together with the circuit configuration example of the column selection section 17 described in the embodiment. The pixel 20A in the modification 2 has a so-called passive circuit configuration similarly to the pixel 20 in the embodiment, and has one photoelectric conversion device 21 and one transistor 22. Moreover, similarly to the pixel 20, the pixel 20A is connected to the readout control line Lread extending along the H direction and the signal line Lsig extending along the V direction.

However, in the pixel 20A, a power source for a reset voltage Va is provided on a terminal (herein, on the anode side) opposite to the readout terminal of the photoelectric conversion device 21, that is, between the photoelectric conversion device 21 and the ground. In addition, the value of the reset voltage Va is controlled by the system control section 16, similarly to the reset voltage Vrst in the embodiment. Therefore, in the modification 2, the reset voltage Va (the reverse bias voltage or the forward bias voltage) which is different between in the pre-reset period Tr0 and in the main reset period Tr1 is supplied to the terminal opposite to the readout terminal of the photoelectric conversion device 21.

Also in the modification 2 having such a configuration, the reset voltage (the inter-end voltage Vpd) which is different between in the pre-reset period Tr0 and in the main reset period Tr1 is applied to the photoelectric conversion device 21 so that effects similar to those in the embodiment are obtainable. In other words, an after image caused by the residual charge is suppressed, and high image quality of the picked-up image is achievable.

[Modification 3]

Figure 18:
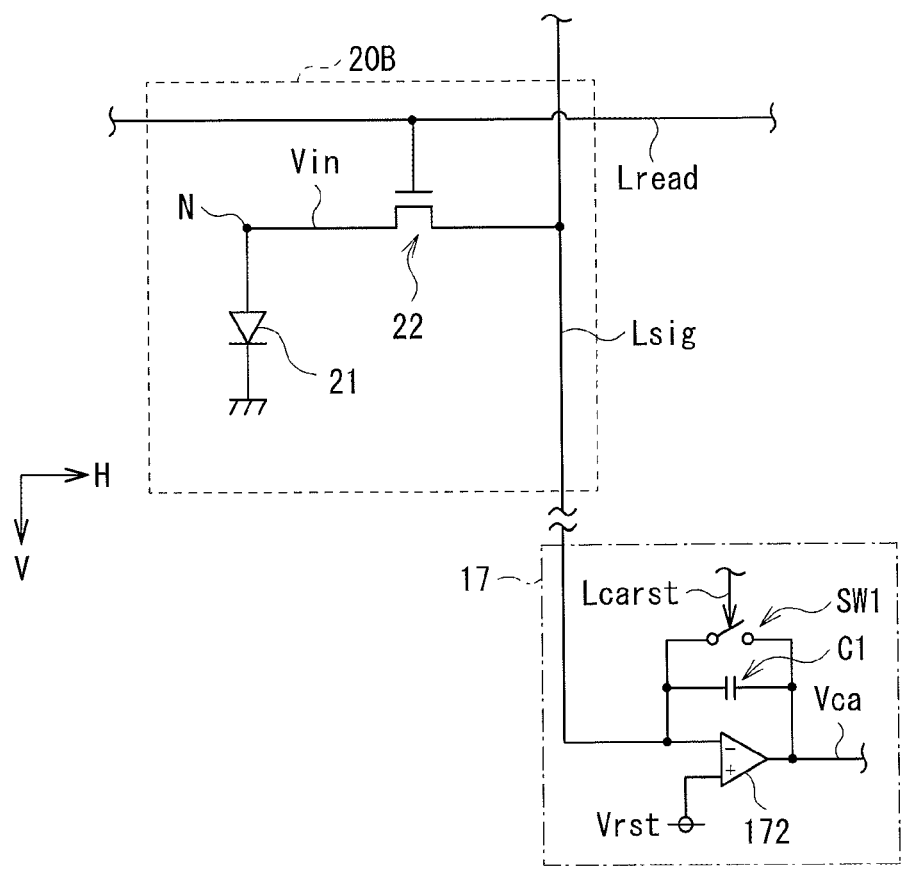
FIG. 18 is a circuit diagram illustrating a configuration of a pixel and the like according to a modification 3.

FIG. 18 illustrates a circuit configuration of a pixel (a pixel 20B) according to the modification 3 together with the circuit configuration example of the column selection section 17. The pixel 20B in the modification 3 has a so-called passive circuit configuration similarly to the pixel 20, and has one photoelectric conversion device 21 and one transistor 22. In addition, similarly to the pixel 20, the pixel 20B is connected to the readout control line Lread extending along the H direction and the signal line Lsig extending along the V direction.

Incidentally, in the pixel 20B, the arrangement direction of the photoelectric conversion device 21 is opposite to that of the pixel 20. Specifically, in the pixel 20B, the anode of the photoelectric conversion device 21 is connected to the storage node N, and the cathode is connected to the ground (grounded). Alternatively, the cathode of the photoelectric conversion device 21 may be connected to a power source potential other than the ground.

Also in an image pickup unit having the pixel 20B with such a configuration, by performing the reset operation and the like in a manner similar to the embodiment or the modification 1 or 2, similar effects are obtainable.

[Modifications 4 and 5]

Figure 19:
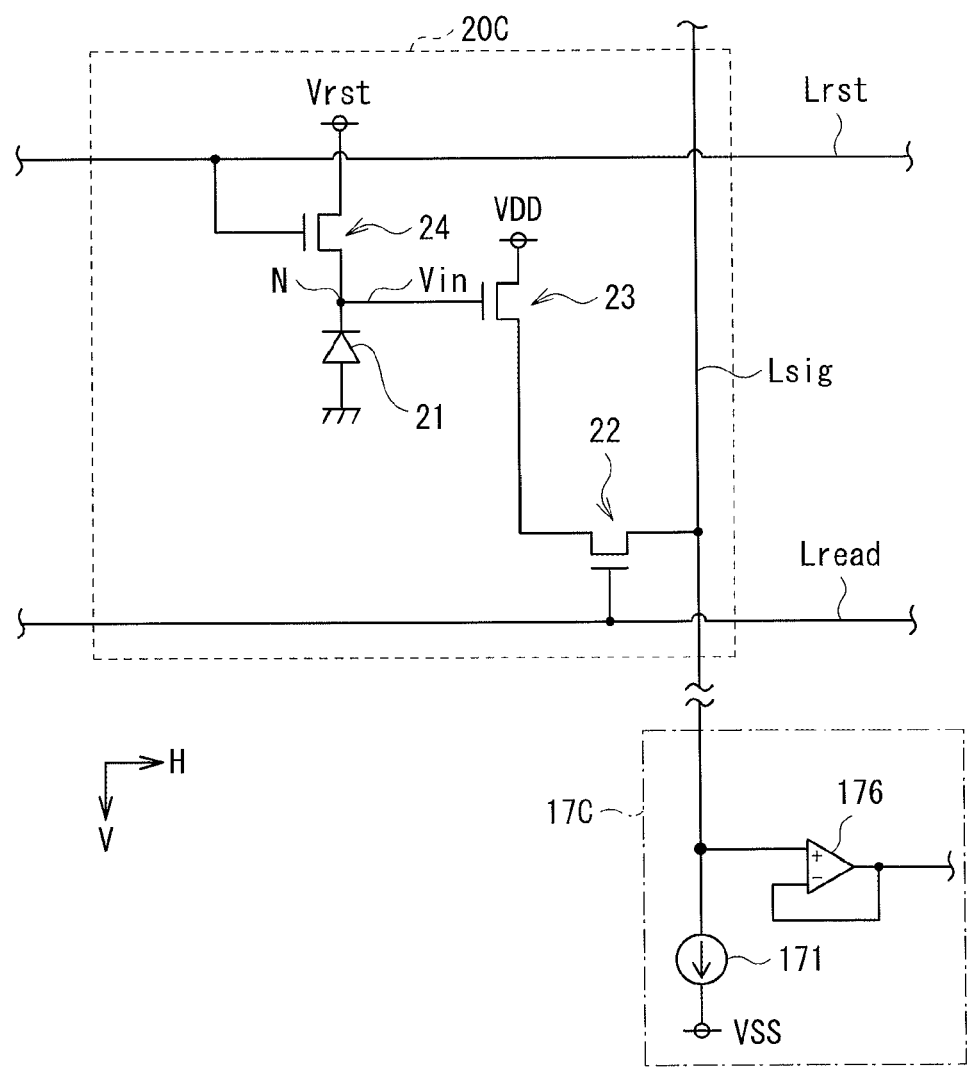
FIG. 19 is a circuit diagram illustrating a configuration of a pixel and the like according to a modification 4.
Figure 20:
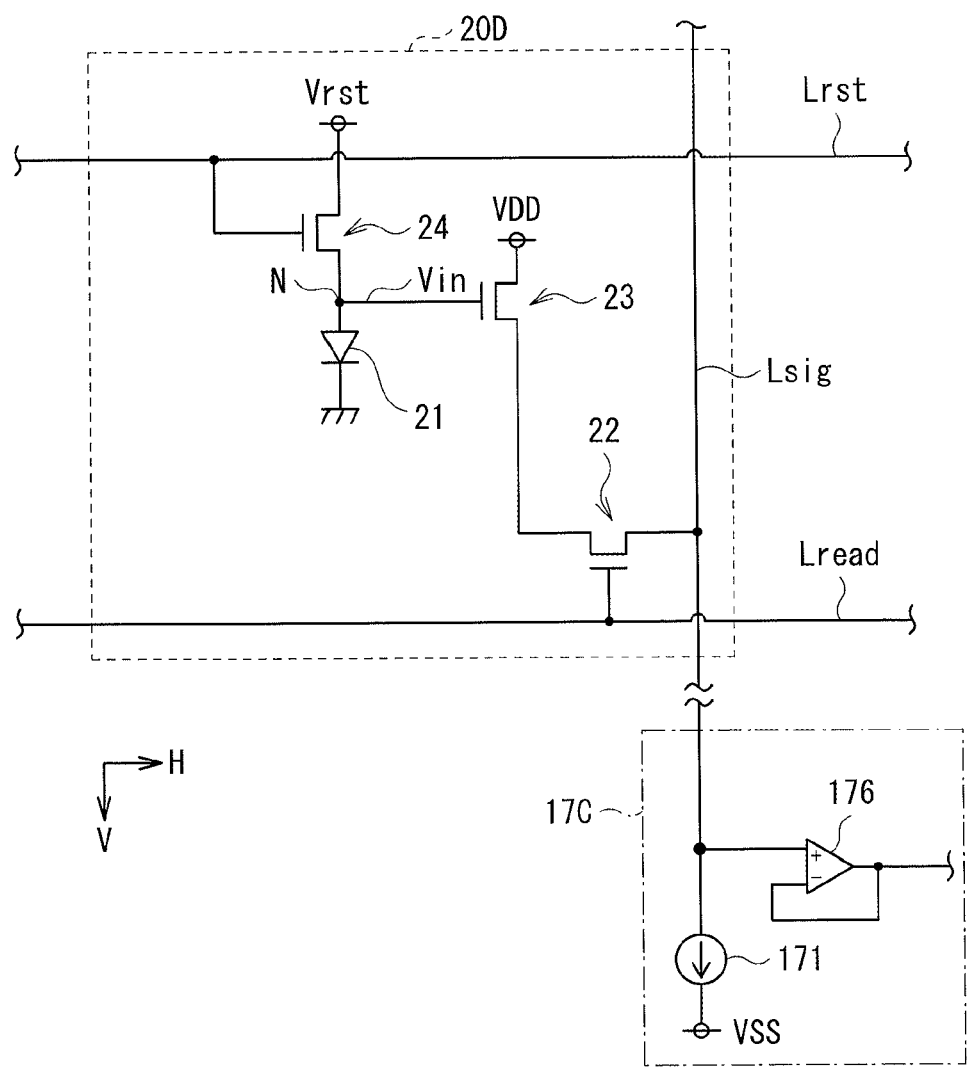
FIG. 20 is a circuit diagram illustrating a configuration of a pixel and the like according to a modification 5.

FIG. 19 illustrates a circuit configuration of a pixel (a pixel 20C) according to the modification 4 together with a circuit configuration example of a column selection section 17C described later. Moreover, FIG. 20 illustrates a circuit configuration of a pixel (a pixel 20D) according to the modification 5 together with the circuit configuration example of the column selection section 17C. Each of the pixels 20C and 20D according to the modifications 4 and 5 has a so-called active circuit configuration, unlike the pixels 20, 20A, and 20B described above.

Specifically, in each of the active pixels 20C and 20D, one photoelectric conversion device 21 and three transistors 22, 23, and 24. In addition, the readout control line Lread and the reset control line Lrst which extend along the H direction and the signal line Lsig extending along the V direction are connected to each of the pixels 20C and 20D.

In each of the pixels 20C and 20D, a gate of the transistor 22 is connected to the readout control line Lread, a source is connected to the signal line Lsig, and a drain is connected to a drain of the transistor 23 which configures a source follower circuit. A source of the transistor 23 is connected to a power source VDD, a gate is connected to the cathode (the pixel 20C illustrated in FIG. 19) or the anode (the pixel 20D illustrated in FIG. 20) (the storage node N) of the photoelectric conversion device 21 and a drain of the transistor 24 which functions as a reset transistor. A gate of the transistor 24 is connected to the reset control line Lrst, and a source is supplied with the reset voltage Vrst. The anode (the pixel 20C) or the cathode (the pixel 20D) of the photoelectric conversion device 21 is connected to the ground (is grounded). Incidentally, in the case of the pixel 20D, the cathode of the photoelectric conversion device 21 may be connected to a power source potential other than the ground.

In addition, the column selection section 17C according to the modifications 4 and 5 illustrated in FIGS. 19 and 20 includes a constant current source 171 and an amplifier 176, instead of the charge amplifier 172, the capacitor C1, and the switch SW1 in the above-described column selection section 17. In the amplifier 176, an input terminal on the positive side is connected to the signal line Lsig, and an input terminal and an output terminal on the negative side are connected to each other, and thus a voltage follower circuit is formed. Incidentally, one of terminals of the constant current source 171 is connected to one end of the signal line Lsig, and the other of terminals of the constant current source 171 is connected to a power source VSS.

As described above, the same as in the case of the above-described passive circuit configuration holds true for the image pickup unit with the pixel 20C or 20D having the active circuit configuration. In other words, by performing the reset operation and the like in a manner similar to the embodiment or the modification 1 or 2, similar effects are obtainable.

[Modification 6]

FIGS. 21A to 21C and FIGS. 22A to 22C are timing charts each illustrating an example of an image pickup drive according to the modification 6.

Figure 21A:
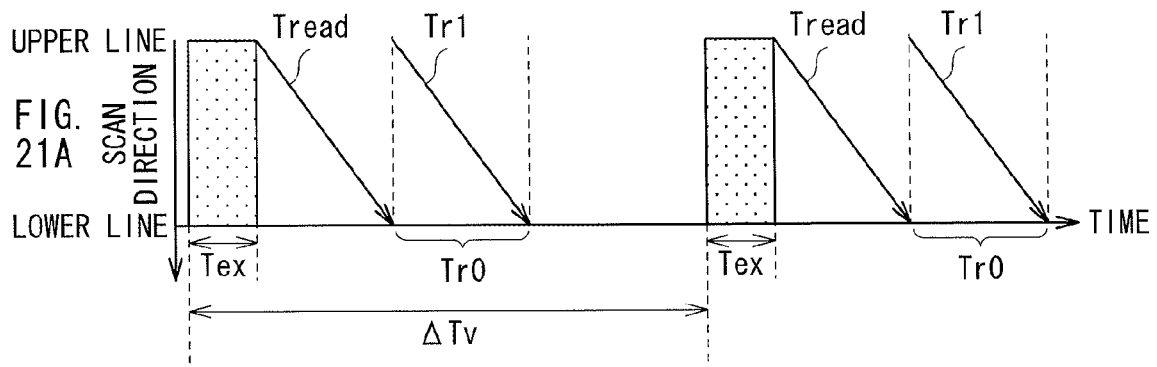
FIGS. 21A to 21C are timing charts each illustrating an example of an image-pickup drive according to a modification 6.
Figure 21B:
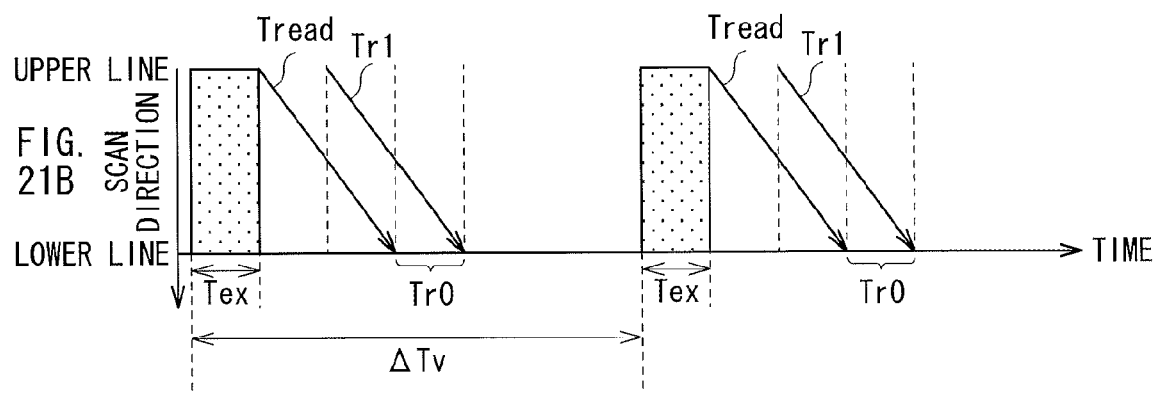

First, in the examples illustrated in FIGS. 21A and 21B, a line-sequential readout drive for performing line-sequential operation in the readout period Tread and a line-sequential reset drive for performing line-sequential operation in the main reset period Tr1 are performed independently and individually from each other. Specifically, in the example illustrated in FIG. 21A, an overlap period is not provided between the line-sequential readout drive and the line-sequential reset drive. On the other hand, in the example of FIG. 21B, an overlap period is provided between the line-sequential readout drive and the line-sequential reset drive.

Figure 21C:
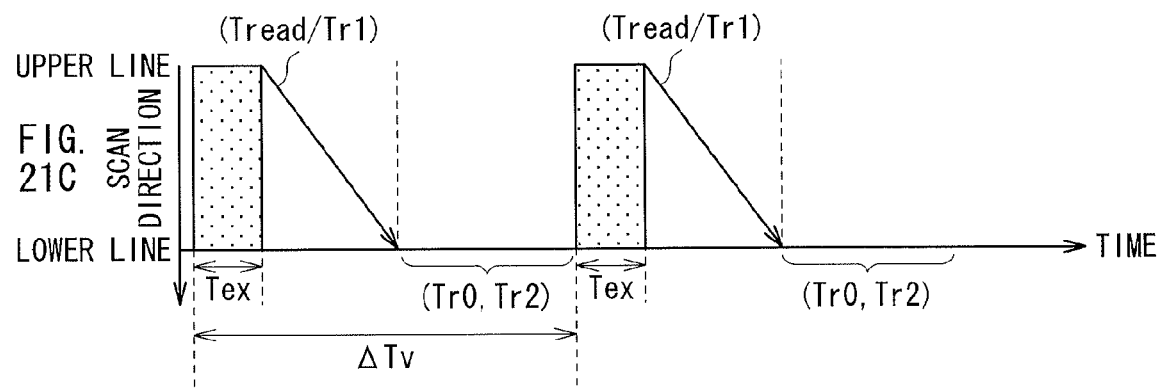

In addition, in the example illustrated in FIG. 21C, only a line sequential drive for performing a line-sequential operation in a period (the readout period Tread/the main reset period Tr1) during which the readout operation and the main reset operation are concurrently performed is performed.

Furthermore, in the examples illustrated in FIGS. 22A to 22C, a method of performing a reset operation concurrently on all of the readout control lines Lread on the horizontal line is used. Specifically, in the example of FIG. 22A, a collective main reset period (a first-time main reset period Tr1) is provided between the line-sequential readout drive for performing the line-sequential operation in the readout period Tread and a line-sequential reset drive for performing a line-sequential operation in a second-time main reset period Tr2. On the other hand, in the example of FIG. 22B, a collective main reset period (the first-time main reset period Tr1) is provided immediately after the line-sequential readout drive for performing the line-sequential operation in the readout period Tread. In the example of FIG. 22C, two collective main reset periods, namely, the first-time main reset period Tr1 and the second-time main reset period Tr2, are provided in this order immediately after the line-sequential readout drive for performing the line-sequential operation in the readout period Tread.

In such a way, even in the case where any other image pickup drive is performed, similar effects are obtainable by providing the pre-reset period Tr0 (by performing the reset operation and the like in a manner similar to the embodiment or the modification 1 or 2) as illustrated in FIGS. 21A to 22C, for example.

In particular, for example as illustrated in FIGS. 21C, 22A, and 22C, in the case where the main reset operation (and the pre-reset operation) is intermittently performed multiple times within a predetermined unit period (for example, one frame period), the residual charge in the pixel is allowed to be further reduced. Consequently, an after image caused by the residual charge is allowed to be effectively suppressed, and higher image quality of the picked-up image is achievable.

[Modification 7]

Figure 23:
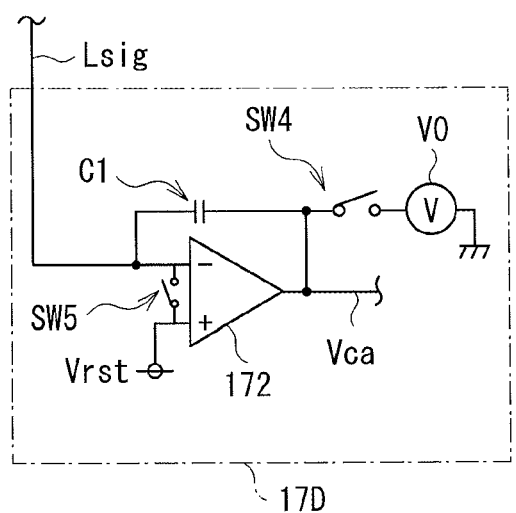
FIG. 23 is a circuit diagram illustrating a schematic configuration of a column selection section according to a modification 7.

FIG. 23 is a circuit diagram illustrating a schematic configuration of a column selection section (a column selection section 17D) according to the modification 7. In the column selection section 17D of the modification 7, the configuration of the charge amplifier circuit is different in the following points from that in the column selection section 17 of the embodiment.

Specifically, a switch SW5 is further provided between an input terminal on the positive side and an input terminal on the negative side of the charge amplifier 172. In addition, a switch SW4 and a power source V0 (used in the amplifier reset operation) are arranged and connected in series in this order between an output terminal of the charge amplifier 172 and the ground.

As described above, in the case where any other charge amplifier circuit is provided, by performing the reset operation and the like in a manner similar to the embodiment or the modification 1 or 2, similar effects are obtainable.

[Modifications 8 and 9]

Figure 24A:
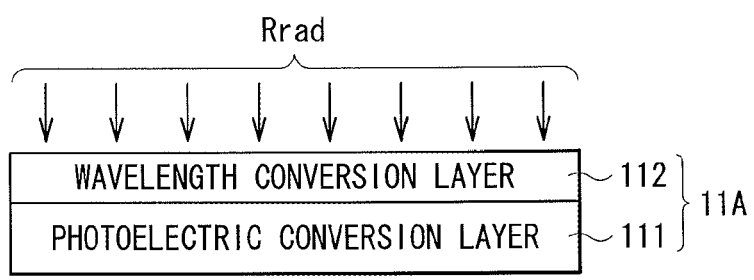
FIGS. 24A and 24B are schematic diagrams illustrating a schematic configuration of an image pickup section according to a modification 8 and a modification 9, respectively.
Figure 24B:
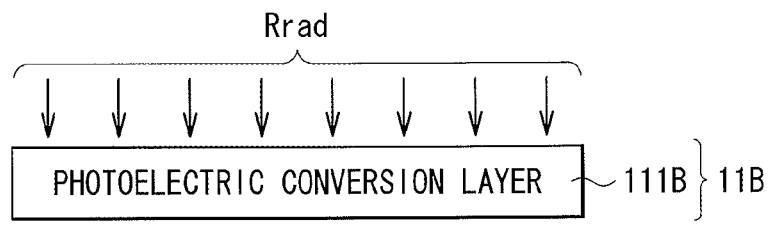

FIGS. 24A and 24B schematically illustrate a schematic configuration of an image pickup section (image pickup sections 11A and 11B) according to the modifications 8 and 9, respectively.

First, the image pickup section 11A according to the modification 8 illustrated in FIG. 24A further includes a wavelength conversion layer 112 in addition to the photoelectric conversion layer 111 described in the embodiment. Specifically, the wavelength conversion layer 112 is provided on the photoelectric conversion layer 111 (on a side close to a light receiving surface (an image pickup surface) of the image pickup section 11A).

The wavelength conversion layer 112 converts the wavelength of the radiation Rrad ($\alpha$-ray, $\beta$-ray, $\gamma$-ray, X-ray, and the like) into the wavelength in the sensitive range of the photoelectric conversion layer 111. Accordingly, in the photoelectric conversion layer 111, information based on the radiation Rrad is allowed to be read. The wavelength conversion layer 112 is formed of, for example, a fluorescent body (for example, a scintillator) which converts radiation such as X-ray into visible light. Such a wavelength conversion layer 112 is obtained by forming an organic planarization film or a planarization film made of spin on glass or the like on the top of the photoelectric conversion layer 111 and forming a fluorescent film made of CsI, NaI, $CaF_2$, or the like on the top of the planarization film.

On the other hand, the image pickup section 11B according to the modification 9 illustrated in FIG. 24B has a photoelectric conversion layer 111B, instead of the photoelectric conversion layer 111 described in the embodiment. The photoelectric conversion layer 111B directly generates an electrical signal based on the incident radiation Rrad. Specifically, the image pickup section 11A of the modification 8 illustrated in FIG. 24A is applied to a so-called indirect-type radiation image pickup unit, whereas the image pickup section 11B of the modification 9 is applied to a so-called direct-type radiation image pickup unit. Note that the photoelectric conversion layer 111B applied to the direct-type radiation image pickup unit is configured of an amorphous selenium (a-Se) semiconductor, a cadmium tellurium (CdTe) semiconductor, or the like.

In the image pickup unit according to the modifications 8 and 9 with the image pickup section 11A or 11B having such a configuration, the image pickup sections 11A and 11B generate an electrical signal based on the incident radiation Rrad, thereby configuring the radiation image pickup unit. Such a radiation image pickup unit is applicable to medical instruments (X-ray image pickup unit such as digital radiography), X-ray inspection apparatuses for personal effects used at air ports and the like, industrial X-ray image pickup units (apparatuses for examination of dangerous goods in a container, examination of contents in a bag or the like), and the like.

APPLICATION EXAMPLE

Application example of any of the image pickup units according to the above-described embodiment and the above-described modifications (the modifications 1 to 9) to an image pickup display system will be described now.

Figure 25:
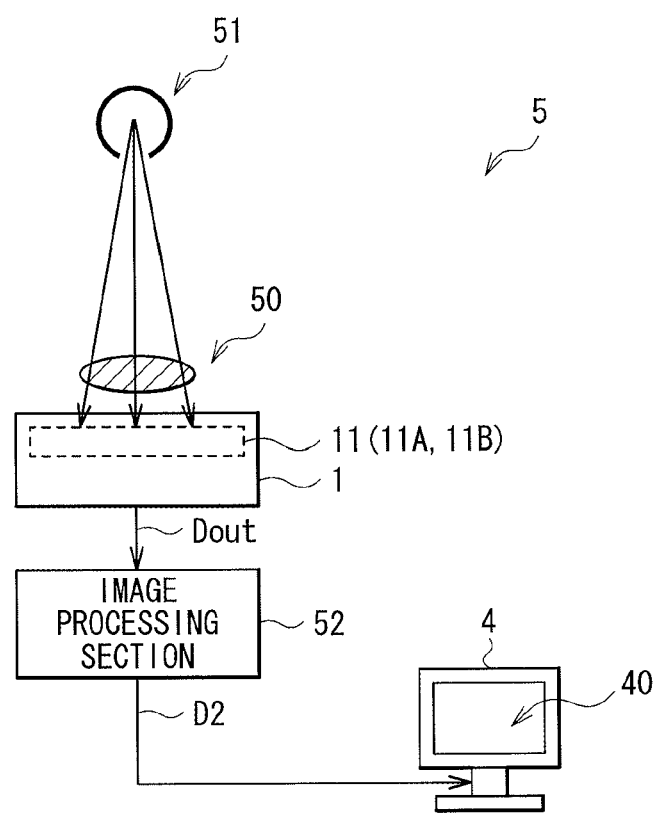
FIG. 25 is a schematic diagram illustrating a schematic configuration of an image pickup display system according to an application example.

FIG. 25 schematically illustrates a schematic configuration example of an image pickup display system (an image pickup display system 5) according to the application example. The image pickup display system 5 includes the image pickup unit 1 having the image pickup section 11 (or 11A or 11B) according to any of the above-described embodiment and the like, an image processing section 52, and a display 4, and in this example, is configured as an image pickup display system using radiation (a radiation image pickup display system).

The image processing section 52 performs predetermined image processing on the output data Dout (the image pickup signal) output from the image pickup unit 1 to generate image data D2. The display 4 displays an image based on the image data D2 generated by the image processing section 52 on a predetermined monitor screen 40.

In the image pickup display system 5 with such a configuration, the image pickup unit 1 (herein, the radiation image pickup unit) acquires the image data Dout of a subject 50, based on irradiation light (herein, radiation) irradiated toward the subject 50 from a light source 51 (herein, a radiation source such as an X-ray source), and then outputs the image data Dout to the image processing section 52. The image processing section 52 performs the above-described predetermined image processing on the input image data Dout, and then outputs the processed image data (display data) D2 to the display 4. The display 4 displays image information (picked-up image) on the monitor screen 40, based on the input image data D2.

In this way, in the image pickup display system 5 of the application example, since the image pickup unit 1 is allowed to acquire the image of the subject 50 as an electrical signal, image display is allowed to be performed by transmitting the acquired electrical signal to the display 4. In other words, the image of the subject 50 is allowed to be observed without using existing radiation photo films, and it is possible to take and display pictures.

Incidentally, in the application example, the case where the image pickup unit 1 is configured as a radiation image pickup unit and the image pickup display system uses radiation has been described as an example. However, the image pickup display system of the disclosure is applicable to an image pickup display system using an image pickup unit of other methods.

[Other Modifications]

Hereinbefore, although the technology of the disclosure has been described with referring to the embodiment, the modifications, and the application example, the technology is not limited to the embodiment and the like, and various modifications may be made.

For example, the circuit configuration of the pixel in the image pickup section is not limited to the circuit configurations described in the above-described embodiment and the like (the circuit configurations of the pixels 20 and 20A to 20D), and the other circuit configurations may be available.

Similarly, the circuit configurations and others of the column selection section and the like are not limited to those described in the above-described embodiment and the like (the circuit configurations of the column selection sections 17 and 17A to 17D), and the other circuit configurations may be available.

Moreover, in the above-described embodiment and the like, although the case where the main reset operation (and the pre-reset operation) is performed once or twice within the predetermined unit period (for example, one frame period) is described as an example, this is not limitative. In other words, for example, the main reset operation (and the pre-reset operation) may be performed three or more times within the predetermined unit period (for example, one frame period).

Moreover, the method of the pre-reset operation described in the above described embodiment and the like (the embodiment, the modifications 1 and 2, and the like) may be used with arbitrarily combination.

Furthermore, the image pickup section, the row scan section, the A/D conversion section (the column selection section), the column scan section, and the like which are described in the above-described embodiment and the like may be formed on the same substrate, for example. Specifically, for example, with use of a polycrystalline semiconductor such as low-temperature polycrystalline silicon, the switches and the like in the circuits may be formed on the same substrate. Therefore, drive operation on the same substrate is allowed to be performed based on the control signal from an external system control section, thereby realizing improvement of reliability at the time of decreasing frame size (frame structure with three free sides) or wiring connection.

Note that the technology may be configured as follows.

(1) An image pickup unit including:

an image pickup section including a plurality of pixels, each of the pixels including a photoelectric conversion device; and a drive section driving each of the pixels to perform a readout operation, a pre-reset operation, and a main reset operation in this order, the readout operation being intended to read out charge from each of the pixels as a signal, the charge being obtained from the photoelectric conversion device, and the pre-reset operation and the main reset operation being intended to reset the charge in the each of the pixels, wherein the drive section applies a voltage to the photoelectric conversion device, the voltage being different between in the pre-reset operation and in the main reset operation.

(2) The image pickup unit according to (1), wherein the drive section applies a reverse bias voltage between both ends of the photoelectric conversion device in the pre-reset operation.

(3) The image pickup unit according to (1), wherein the drive section applies a forward bias voltage between both ends of the photoelectric conversion device in the pre-reset operation.

(4) The image pickup unit according to (3), further including a signal processing section generating an output signal, based on an image pickup signal obtained through the readout operation, wherein the signal processing section performs subtraction processing common to the pixels on an image pickup signal obtained through a subsequent readout operation after the pre-reset operation using the forward bias voltage, and generates the output signal.

(5) The image pickup unit according to any one of (1) to (4), wherein the drive section supplies a terminal on a readout side of the photoelectric conversion device with a reset voltage that is different between in the pre-reset operation and in the main reset operation.

(6) The image pickup unit according to (5), wherein
the drive section includes an amplifier, a first input terminal of the amplifier being connected to a signal line used in the readout operation, and a second input terminal of the amplifier being supplied with the reset voltage, and
the reset voltage is supplied to the terminal on the readout side of the photoelectric conversion device through an imaginary short phenomenon by the amplifier.

(7) The image pickup unit according to (5), wherein
the drive section includes a switch to switch over supply or not of the reset voltage to a signal line used in the readout operation, and
the reset voltage is supplied to the terminal on the readout side of the photoelectric conversion device through the switch and the signal line.

(8) The image pickup unit according to any one of (1) to (7), wherein the drive section supplies a terminal on a side opposite to the readout side of the photoelectric conversion device with a reset voltage that is different between in the pre-reset operation and in the main reset operation.

(9) The image pickup unit according to any one of (1) to (8), wherein the drive section drives each of the pixels to intermittently perform the main reset operation multiple times within a predetermined unit period.

(10) The image pickup unit according to any one of (1) to (9), wherein the photoelectric conversion device is configured of a PIN photodiode.

(11) The image pickup unit according to any one of (1) to (10), wherein
the image pickup section generates an electrical signal based on incident radiation, and
the image pickup unit is configured as a radiation image pickup unit.

(12) The image pickup unit according to (11), wherein the image pickup section includes a photoelectric conversion layer configuring the photoelectric conversion device, and a wavelength conversion layer converting a wavelength of the radiation into a wavelength in a sensitive range of the photoelectric conversion layer.

(13) The image pickup unit according to (11), wherein the image pickup section includes a photoelectric conversion layer, the photoelectric conversion layer configuring the photoelectric conversion device and directly generating the electrical signal based on the radiation.

(14) The image pickup unit according to any one of (11) to (13), wherein the radiation is an X-ray.

(15) An image pickup display system including an image pickup unit and a display displaying an image based on an image pickup signal obtained from the image pickup unit, the image pickup unit including:
an image pickup section including a plurality of pixels, each of the pixels including a photoelectric conversion device; and
a drive section driving each of the pixels to perform a readout operation, a pre-reset operation, and a main reset operation in this order, the readout operation being intended to read out charge from each of the pixels as a signal, the charge being obtained from the photoelectric conversion device, and the pre-reset operation and the main reset operation being intended to reset the charge in each of the pixels, wherein
the drive section applies a voltage to the photoelectric conversion device, the voltage being different between in the pre-reset operation and in the main reset operation.

The present application contains subject matter related to that disclosed in Japanese Priority Patent Application JP 2011-241036 filed in the Japan Patent Office on Nov. 2, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. An image pickup unit comprising:
an image pickup section including a plurality of pixels, each of the pixels including a photoelectric conversion device;
a drive section driving each of the pixels to perform a readout operation, a pre-reset operation, and a main reset operation in this order, the readout operation being intended to read out charge from each of the pixels as a signal, the charge being obtained from the photoelectric conversion device, and the pre-reset operation and the main reset operation being intended to reset the charge in the each of the pixels, and
a signal processing section generating an output signal, based on an image pickup signal obtained through the readout operation, wherein
the signal processing section performs subtraction processing common to the pixels on an image pickup signal obtained through a subsequent readout operation after the pre-reset operation using the forward bias voltage, and generates the output signal,
the drive section applies a voltage to the photoelectric conversion device, the voltage being different between in the pre-reset operation and in the main reset operation, and
the drive section applies a forward bias voltage between both ends of the photoelectric conversion device in the pre-reset operation.

2. The image pickup unit according to claim 1, wherein the drive section applies a reverse bias voltage between both ends of the photoelectric conversion device in the pre-reset operation.

3. The image pickup unit according to claim 1, wherein the drive section supplies a terminal on a readout side of the photoelectric conversion device with a reset voltage that is different between in the pre-reset operation and in the main reset operation.

4. An image pickup unit comprising:
an image pickup section including a plurality of pixels, each of the pixels including a photoelectric conversion device, and
a drive section driving each of the pixels to perform a readout operation, a pre-reset operation, and a main reset operation in this order, the readout operation being intended to read out charge from each of the pixels as a signal, the charge being obtained from the photoelectric conversion device, and the pre-reset operation and the main reset operation being intended to reset the charge in the each of the pixels, wherein
the drive section applies a voltage to the photoelectric conversion device, the voltage being different between in the pre-reset operation and in the main reset operation,
the drive section supplies a terminal on a readout side of the photoelectric conversion device with a reset voltage that is different between in the pre-reset operation and in the main reset operation, the drive section includes an amplifier, a first input terminal of the amplifier being connected to a signal line used in the readout operation, and a second input terminal of the amplifier being supplied with the reset voltage, and the reset voltage is supplied to the terminal on the readout side of the photoelectric conversion device through an imaginary short phenomenon by the amplifier the drive section applies a voltage to the photoelectric conversion device, the voltage being different between in the pre-reset operation and in the main reset operation.

5. An image pickup unit comprising:

an image pickup section including a plurality of pixels, each of the pixels including a photoelectric conversion device, and a drive section driving each of the pixels to perform a readout operation, a pre-reset operation, and a main reset operation in this order, the readout operation being intended to read out charge from each of the pixels as a signal, the charge being obtained from the photoelectric conversion device, and the pre-reset operation and the main reset operation being intended to reset the charge in the each of the pixels, wherein the drive section applies a voltage to the photoelectric conversion device, the voltage being different between in the pre-reset operation and in the main reset operation, the drive section supplies a terminal on a readout side of the photoelectric conversion device with a reset voltage that is different between in the pre-reset operation and in the main reset operation, the drive section includes a switch to switch over supply or not of the reset voltage to a signal line used in the readout operation, and the reset voltage is supplied to the terminal on the readout side of the photoelectric conversion device through the switch and the signal line.

6. The image pickup unit according to claim 1, wherein the drive section supplies a terminal on a side opposite to the readout side of the photoelectric conversion device with a reset voltage that is different between in the pre-reset operation and in the main reset operation.

7. The image pickup unit according to claim 1, wherein the drive section drives each of the pixels to intermittently perform the main reset operation multiple times within a predetermined unit period.

8. The image pickup unit according to claim 1, wherein the photoelectric conversion device is configured of a PIN photodiode.

9. The image pickup unit according to claim 1, wherein
the image pickup section generates an electrical signal based on incident radiation, and
the image pickup unit is configured as a radiation image pickup unit.

10. The image pickup unit according to claim 9, wherein the image pickup section includes a photoelectric conversion layer configuring the photoelectric conversion device, and a wavelength conversion layer converting a wavelength of the radiation into a wavelength in a sensitive range of the photoelectric conversion layer.

11. The image pickup unit according to claim 9, wherein the image pickup section includes a photoelectric conversion layer, the photoelectric conversion layer configuring the photoelectric conversion device and directly generating the electrical signal based on the radiation.

12. The image pickup unit according to claim 9, wherein the radiation is an X-ray.

* * * * *